(12) United States Patent
Go et al.

(10) Patent No.: US 11,128,711 B2
(45) Date of Patent: Sep. 21, 2021

(54) IN-VEHICLE COMMUNICATION SYSTEM, GATEWAY, SWITCHING DEVICE AND COMMUNICATION CONTROL METHOD

(71) Applicants: Sumitomo Electric Industries, Ltd., Osaka (JP); AUTONETWORKS TECHNOLOGIES, LTD., Yokkaichi (JP); SUMITOMO WIRING SYSTEMS, LTD., Yokkaichi (JP)

(72) Inventors: Darmawan Go, Osaka (JP); Hirofumi Urayama, Osaka (JP); Yoshihisa Nagamura, Osaka (JP); Takeshi Hagihara, Yokkaichi (JP); Yasuhiro Yabuuchi, Yokkaichi (JP)

(73) Assignees: Sumitomo Electric Industries, Ltd., Osaka (JP); AutoNetworks Technologies, Ltd., Yokkaichi (JP); Sumitomo Wiring Systems, Ltd., Yokkaichi (JP)

( * ) Notice: Subject to any disclaimer, the term of this patent is extended or adjusted under 35 U.S.C. 154(b) by 97 days.

(21) Appl. No.: 16/481,352

(22) PCT Filed: Oct. 30, 2017

(86) PCT No.: PCT/JP2017/039109
§ 371 (c)(1),
(2) Date: Jul. 26, 2019

(87) PCT Pub. No.: WO2018/138991
PCT Pub. Date: Aug. 2, 2018

(65) Prior Publication Data
US 2019/0394277 A1    Dec. 26, 2019

(30) Foreign Application Priority Data

Jan. 27, 2017 (JP) .............................. JP2017-012816

(51) Int. Cl.
*H04L 12/28* (2006.01)
*H04L 29/08* (2006.01)
(Continued)

(52) U.S. Cl.
CPC ................ *H04L 67/12* (2013.01); *G06F 8/65* (2013.01); *G06F 9/445* (2013.01); *G06F 11/1433* (2013.01); *H04L 12/66* (2013.01)

(58) Field of Classification Search
CPC ................ H04L 12/66; H04L 2012/46; H04L 2012/5618; H04L 12/46; H04L 67/12; (Continued)

(56) References Cited

U.S. PATENT DOCUMENTS

2010/0131816 A1* 5/2010 Yamamoto .......... H04L 12/4013
714/749
2015/0372975 A1* 12/2015 Moriya ............... B61L 15/0018
726/12
(Continued)

FOREIGN PATENT DOCUMENTS

JP       2014-182571 A      9/2014

*Primary Examiner* — Siren Wei
(74) *Attorney, Agent, or Firm* — Baker Botts L.L.P.; Michael A. Sartori

(57) ABSTRACT

An in-vehicle communication system is an in-vehicle communication system to be mounted on a vehicle, and includes: a gateway performing relay processing involving communication protocol conversion; and one or a plurality of switching devices performing relay processing not involving the communication protocol conversion, the gateway or the switching device manages data update of a target device mounted on the vehicle, the gateway receives update data for the target device from an external device disposed outside the vehicle, transmits, to the switching device connected thereunder, the update data for the target device, which is connected to the switching device, not holding the update data at least after completing the update, and holds the
(Continued)

update data for the target device, which is connected thereto, also after completing the update not through the switching device.

13 Claims, 9 Drawing Sheets

(51) Int. Cl.
*G06F 8/65* (2018.01)
*G06F 9/445* (2018.01)
*G06F 11/14* (2006.01)
*H04L 12/66* (2006.01)

(58) Field of Classification Search
CPC ........ G06F 8/65; G06F 9/445; G06F 11/1433; B60R 16/023; G05B 19/4185; G07C 5/00; H04W 84/18
See application file for complete search history.

(56) References Cited

U.S. PATENT DOCUMENTS

2016/0219051 A1* 7/2016 Morita ................ H04L 63/0876
2016/0378457 A1* 12/2016 Adachi .................. G06F 11/00
713/181

* cited by examiner

IN-VEHICLE COMMUNICATION SYSTEM, GATEWAY, SWITCHING DEVICE AND COMMUNICATION CONTROL METHOD

CROSS-REFERENCE TO RELATED APPLICATIONS

This application is the national phase under 35 U.S.C. § 371 of PCT International Application No. PCT/JP2017/039109 which has an International filing date of Oct. 30, 2017 and designated the United States of America.

FIELD

The present disclosure relates to an in-vehicle communication system, a gateway, a switching device, a communication control method and a communication control program.

This application is based upon and claims the benefit of priority of the prior Japanese Patent Application No. 2017-012816, filed on Jan. 27, 2017, the entire contents of which are incorporated herein by reference.

BACKGROUND

Patent Literature 1 (Japanese Patent Application Laid-Open Publication No. 2014-182571) discloses the following vehicle relay device, In a multi-protocol supported vehicle relay device, when a program of a vehicle electronic control unit connected through the multi-protocol is to be rewritten in an on-board state, differential data between a new program and an old program is retrieved, and the differential data of the new program is transmitted to be stored in the vehicle electronic control unit.

SUMMARY (1) An in-vehicle communication system of the present disclosure is an in-vehicle communication system to be mounted on a vehicle, and includes: a gateway performing relay processing involving communication protocol conversion; and one or a plurality of switching devices performing relay processing not involving the communication protocol conversion, in which the gateway or the switching device manages data update of a target device mounted on the vehicle, the gateway receives update data for the target device from an external device disposed outside the vehicle, the gateway transmits, to the switching device connected thereunder, the update data for the target device, which is connected to the switching device, not holding the update data at least after completing the update, and the gateway holds, also after completing the update, the update data for the target device, which is connected thereto not through the switching device.

(9) A gateway of the present disclosure is a gateway to be mounted on a vehicle, and includes: a relay section performing relay processing involving communication protocol conversion; a management section managing data update of a target device mounted on the vehicle; and a storage section, in which the relay section receives update data for the target device from an external device disposed outside the vehicle, the storage section holds the update data received by the relay section, the relay section transmits data to be relayed corresponding to the update data for the target device, which is connected to a switching device connected thereunder and performing relay processing not involving the communication protocol conversion, to the switching device, and the management section deletes the data to be relayed from the storage section at least after completing the update, and causes the storage section to hold, also after completing the update, the update data for the target device, which is to be connected to the gateway not through the switching device.

(10) A switching device of the present disclosure is a switching device to be mounted on a vehicle, and includes: a switching section performing relay processing not involving communication protocol conversion; a management section managing data update of a target device mounted on the vehicle; and a storage section, in which a gateway performing relay processing involving the communication protocol conversion to be connected to the switching device, the switching section receives update data for the target device from the gateway or a different switching device disposed on an upstream side toward the gateway, the storage section holds the update data received by the switching section, the switching section transmits data to be relayed corresponding to the update data for the target device, which is connected to a different switching device disposed on a downstream side, to the different switching device disposed on the downstream side, and deletes the data to be relayed from the storage section at least after completing the update, and the management section causes the storage section to hold, also after completing the update, the update data for the target device, which is to be connected to the switching device not through the different switching device.

(11) A communication control method of the present disclosure is to be employed in a gateway mounted on a vehicle, capable of performing relay processing involving communication protocol conversion, and including a storage section, and includes the steps of managing data update of a target device mounted on the vehicle; receiving update data for the target device from an external device disposed outside the vehicle; holding the received update data in the storage section; and transmitting data to be relayed corresponding to the update data for the target device, which is connected to a switching device connected thereunder and performing relay processing not involving the communication protocol conversion, to the switching device, in which in the step of managing data update, the data to be relayed is deleted from the storage section at least after completing the update, and the storage section is caused to hold, also after completing the update, the update data for the target device, which is connected to the gateway not through the switching device.

(12) A communication control method of the present disclosure is to be employed in a switching device mounted on a vehicle, performing relay processing not involving communication protocol conversion and including a storage section, the switching device being connected to a gateway performing relay processing involving the communication protocol conversion, and includes the steps of managing data update of a target device mounted on the vehicle; receiving update data for the target device from the gateway or a different switching device disposed on an upstream side toward the gateway; holding the received update data in the storage section; and transmitting data to be relayed corresponding to the update data for the target device which is connected to a different switching device disposed on a downstream side, to the different switching device disposed on the downstream side, and deleting the data to be relayed from the storage section at least after completing the update, in which in the step of managing data update, the storage section is caused to hold the update data for the target device, which is connected to the switching device not through the different switching device also after completing the update.

(13) A communication control program of the present disclosure is to be employed in a gateway mounted on a vehicle and including a storage section, and causes a computer to function as: a relay section performing relay processing involving communication protocol conversion; and a management section managing data update of a target device mounted on the vehicle, in which the relay section receives update data for the target device from an external device disposed outside the vehicle, the storage section holds the update data received by the relay section, the relay section transmits data to be relayed corresponding to the update data for the target device, which is connected to a switching device connected thereunder and performing relay processing not involving the communication protocol conversion, to the switching device, and the management section deletes the data to be relayed from the storage section at least after completing the update, and causes the storage section to hold, also after completing the update, the update data for the target device, which is to be connected to the gateway not through the switching device.

(14) A communication control program of the present disclosure is to be employed in a switching device mounted on a vehicle and including a storage section, and causes a computer to function as: a switching section performing relay processing not involving communication protocol conversion; and a management section managing data update of a target device mounted on the vehicle, in which a gateway performing relay processing involving the communication protocol conversion is connected to the switching device, the switching section receives update data for the target device from the gateway or a different switching device disposed on an upstream side toward the gateway, the storage section holds the update data received by the switching section, the switching section transmits data to be relayed corresponding to the update data for the target device, which is connected to a different switching device disposed on a downstream side, to the different switching device disposed on the downstream side, and deletes the data to be relayed from the storage section at least after completing the update, and the management section causes the storage section to hold, also after completing the update, the update data for the target device, which is to be connected to the switching device not through the different switching device.

One aspect of the present disclosure can be realized not only as an in-vehicle communication system including such a characteristic processing section but also as a method including a step of such characteristic processing or a program for causing a computer to execute such a step. Besides, another aspect of the present disclosure can be realized as a semiconductor integrated circuit realizing a part or the whole of the in-vehicle communication system.

In addition, another aspect of the present disclosure can be realized not only as a gateway including such a characteristic processing section but also as a semiconductor integrated circuit realizing a part or the whole of the gateway.

Furthermore, another aspect of the present disclosure can be realized not only as a switching device including such a characteristic processing section but also as a semiconductor integrated circuit realizing a part or the whole of the switching device.

The above and further objects and features will more fully be apparent from the following detailed description with accompanying drawings.

DETAILED DESCRIPTION

Figure 1:
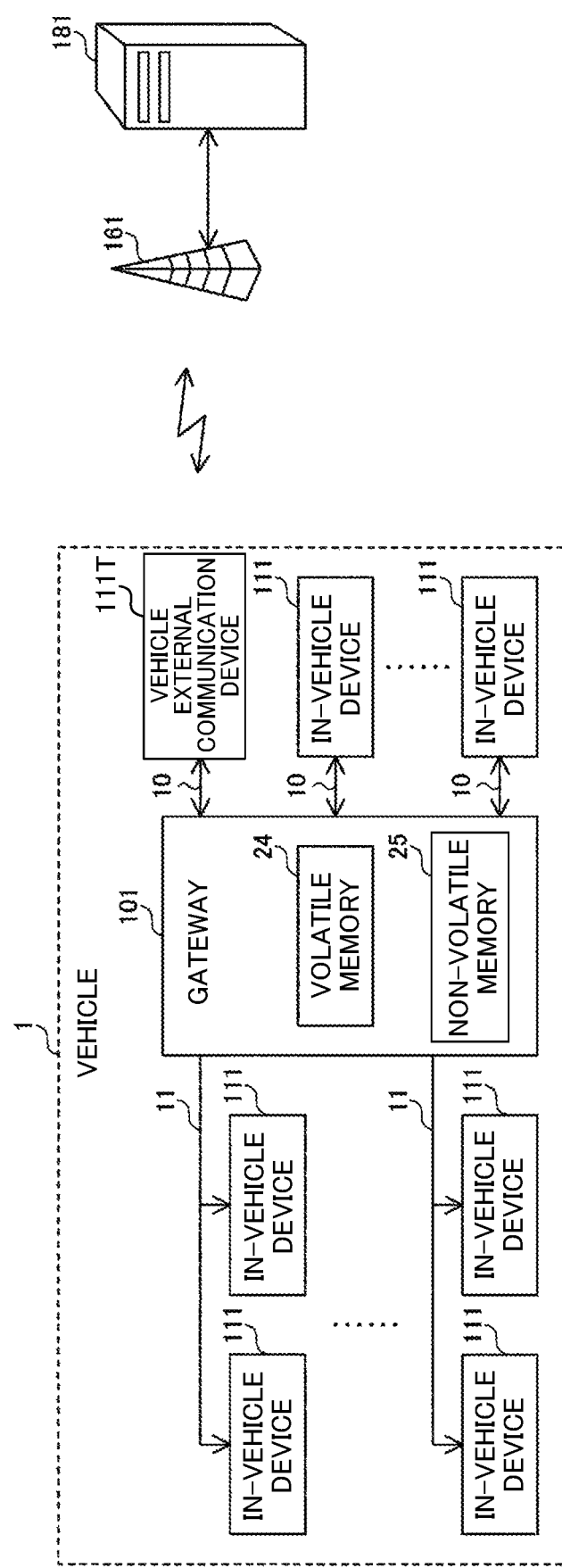
FIG. 1 is a diagram illustrating the configuration of a comparative example of an in-vehicle communication system according to an embodiment of the present disclosure.

A technique for automatically updating firmware of a device used in a vehicle from a remote position has been conventionally developed.

Problems to be Solved by Present Disclosure

A vehicle relay device described in Patent Literature 1 stores, in a flash ROM (Read Only Memory), a program or the like stored in a vehicle electronic control unit. In such a vehicle network, a switching device may be provided under, for example, the vehicle relay device. In such a configuration, for example, when a large number of vehicle electronic control units are connected to the switching device, the memory usage of the flash ROM may be so increased that the flash ROM may run out of free space in some cases.

The present disclosure was accomplished to solve the problem, and the object is to provide an in-vehicle communication system, a gateway, a switching device, a communication control method and a communication control program with which the gateway can be preventing from running out of free space in a storage area while managing data update of a target device in the in-vehicle communication system.

Effects of Present Disclosure

According to the present disclosure, a gateway can be prevented from running out of free space in a storage area while managing data update of a target device in an in-vehicle communication system.

Description of Embodiments of Present Disclosure

First, contents of embodiments of the present disclosure will be listed as follows:

(1) An in-vehicle communication system according to an embodiment of the present disclosure is an in-vehicle communication system to be mounted on a vehicle, and includes a gateway performing relay processing involving communication protocol conversion, and one or a plurality of switching devices performing relay processing not involving the communication protocol conversion, the gateway or the switching device manages data update of a target device mounted on the vehicle, the gateway receives update data for the target device from an external device disposed outside the vehicle, the gateway transmits, to the switching device connected thereunder, the update data for the target device, which is connected to the switching device, not holding the update data at least after completing the update, and the gateway holds, also after completing the update, the update data for the target device, which is connected thereto not via the switching device.

In this manner, owing to the configuration in which the gateway transmits the update data for the target device connected to the switching device connected thereunder, the switching device can be caused to manage the data update of the target device by, for example, causing the switching device to hold the update data. Besides, owing to the configuration in which the gateway does not hold the update data for the target device at least after completing the update, consumption of a storage area of the gateway can be suppressed. Furthermore, owing to the configuration in which the gateway holds, also after completing the update, the update data for the target device connected thereto not through the switching device, the data update of the target device can be easily managed. Accordingly, the gateway can be preventing from running out of free space in the storage area while managing the data update of the target device in the in-vehicle communication system.

(2) Preferably, the in-vehicle communication system includes a plurality of the switching devices serially connected to each other, each of the switching devices receives the update data from the gateway or a different one of the switching devices disposed on an upstream side, each of the switching devices transmits the update data for the target device, which is connected to a different one of the switching devices disposed on a downstream side, to the different one of the switching devices, not holding the update data at least after completing update, and each of the switching devices holds, also after completing the update, the update data for the target device, which is connected thereto not through the different one of the switching devices.

Owing to the configuration in which the switching device thus holds, also after completing the update, the update data transmitted from the gateway or a different switching device disposed on the upstream side and corresponding to the update data for the target device connected thereto not through a different switching device, the update data is held in the switching device, and hence the gateway can delete the update data. Besides, owing to the configuration in which the switching device transmits the update data for the target device connected to a different switching device disposed on the downstream side to this different switching device, this different switching device can be caused to manage the data update of the target device by, for example, causing the different switching device to hold the update data. Furthermore, owing to the configuration in which the switching device does not hold the update data for the target device at least after completing the update, the consumption of the storage area in the switching device can be suppressed.

(3) Preferably, each of the switching devices manages the data update of the target device, which is connected thereto not through a different one of the switching devices, and the gateway instructs the switching device managing the data update to perform the data update of the target device.

Owing to such a configuration, the processing for managing target devices can be decentralized to the switching devices in the in-vehicle communication system, and hence, the processing load of the gateway can be reduced.

(4) More preferably, each of the switching devices performs, when the data update is completed, processing for discarding the update data held before the update and holding the update data of after the update.

Owing to the configuration in which the update data held before the update is not thus discarded until the update of the target device is completed, for example, when the update of the target device has failed, the target device can be restarted by using the update data held before the update. Besides, owing to the configuration in which the update data of after the update is held, failure of the update of the target device can be coped with in performing new update.

(5) Preferably, the gateway manages the data update of the target device, which is connected to one of the switching devices connected thereunder.

Owing to such a configuration, the processing for managing the target devices can be concentrated on the gateway in the in-vehicle communication system, and therefore, maintenance of the in-vehicle communication system can be simplified.

(6) More preferably, each of the switching devices monitors data transmitted or received therethrough between the gateway and the target device, and holds the update data transmitted therethrough from the gateway to the target device.

Owing to such a configuration, processing for downloading the update data by the switching device and processing for downloading the update date by the target device can be performed in parallel, and therefore, time necessary for the downloading processing can be shortened as compared with time necessary in a configuration in which the update data is successively downloaded by the switching device and the target device.

(7) More preferably, each of the switching devices performs processing for discarding the update data held before the update and holding the update data of after the update when an update complete notification transmitted from the target device to the gateway is detected.

Owing to the configuration in which the update data held before the update is not thus discarded until detection of the update complete notification transmitted when the update of the target device is completed, for example, when the update of the target device has failed, the target device can be restarted by using the update data held before the update. Besides, owing to the configuration in which the update data of after the update is held, failure of the update of the target device can be coped with in performing new update.

(8) More preferably, each of the switching devices performs the processing when a prescribed condition is satisfied after completing the data update.

Owing to such a configuration, for example, when a communication rate of the switching device is high at timing immediately after completing the data update, the processing may be delayed until the communication rate becomes low, and hence, excessive load can be prevented from being applied to the switching device.

(9) A gateway according to an embodiment of the present disclosure is a gateway to be mounted on a vehicle, and includes: a relay section performing relay processing involving communication protocol conversion; a management section managing data update of a target device mounted on the vehicle; and a storage section, in which the relay section receives update data for the target device from an external device disposed outside the vehicle, the storage section holds the update data received by the relay section, the relay section transmits data to be relayed corresponding to the update data for the target device, which is connected to a switching device connected thereunder and performing relay processing not involving the communication protocol conversion, to the switching device, and the management section deletes the data to be relayed from the storage section at least after completing the update, and causes the storage section to hold, also after completing the update, the update data for the target device, which is to be connected to the gateway not through the switching device.

Owing to the configuration in which the gateway thus transmits the data to be relayed to the switching device, the switching device can be caused to manage the data update of the target device by, for example, causing the switching device to hold the data to be relayed. Besides, owing to the configuration in which the data to be relayed is deleted from the storage section at least after completing the update, the consumption of the storage area in the gateway can be suppressed. Furthermore, owing to the configuration in which the gateway holds, also after completing the update, the update data for the target device connected thereto not through the switching device, the data update of the target device can be easily managed. Accordingly, while managing the data update of the target device in the in-vehicle communication system, the gateway can be prevented from running out of free space in the storage area.

(10) A switching device according to an embodiment of the present disclosure is a switching device to be mounted on a vehicle, and includes: a switching section performing relay processing not involving communication protocol conversion; a management section managing data update of a target device mounted on the vehicle; and a storage section, in which a gateway performing relay processing involving the communication protocol conversion is to be connected to the switching device, the switching section receives update data for the target device from the gateway or a different switching device disposed on an upstream side toward the gateway, the storage section holds the update data received by the switching section, the switching section transmits data to be relayed corresponding to the update data for the target device, which is connected to a different switching device disposed on a downstream side, to the different switching device disposed on the downstream side, and deletes the data to be relayed from the storage section at least after completing the update, and the management section causes the storage section to hold, also after completing the update, the update data for the target device, which is to be connected to the switching device not through the different switching device.

Owing to such a configuration in which the switching device thus holds, also after completing the update, the update data that is received from the gateway or the different switching device disposed on the upstream side and corresponds to the update data for the target device connected thereto not through a different switching device, the switching device can easily manage the data update of the target device, and since the update data is held in the switching device, the gateway can delete the update data. Furthermore, owing to the configuration in which the switching device transmits the data to be relayed to the different switching device disposed on the downstream side, the different switching device can be caused to manage the data update of the target device by, for example, causing the different switching device disposed on the downstream side to hold the data to be relayed. Besides, owing to the configuration in which the data to be relayed is deleted from the storage section at least after completing the update, the consumption of the storage area in the switching device can be suppressed. Accordingly, while managing the data update of the target device in the in-vehicle communication system, the gateway can be prevented from running out of free space in the storage area.

(11) A communication control method according to an embodiment of the present disclosure is a communication control method to be employed in a gateway mounted on a vehicle, capable of performing relay processing involving communication protocol conversion, and including a storage section, and includes the steps of managing data update of a target device mounted on the vehicle; receiving update data for the target device from an external device disposed outside the vehicle; holding the received update data in the storage section; and transmitting data to be relayed corresponding to the update data for the target device, which is connected to a switching device connected thereunder and performing relay processing not involving the communication protocol conversion, to the switching device, in which in the step of managing data update, the data to be relayed is deleted from the storage section at least after completing the update, and the storage section is caused to hold, also after completing the update, the update data for the target device, which is connected to the gateway not through the switching device.

Owing to the configuration in which the gateway thus transmits the data to be relayed to the switching device, the switching device can be caused to manage the data update of the target device by, for example, causing the switching device to hold the data to be relayed. Besides, owing to the configuration in which the data to be relayed is deleted from the storage section at least after completing the update, the consumption of the storage area in the gateway can be suppressed. Furthermore, owing to the configuration in which the gateway holds, also after completing the update, the update data for the target device connected thereto not through the switching device, the data update of the target device can be easily managed. Accordingly, while managing the data update of the target device in the in-vehicle communication system, the gateway can be prevented from running out of free space in the storage area.

(12) A communication control method according to an embodiment of the present disclosure is a communication control method to be employed in a switching device mounted on a vehicle, performing relay processing not involving communication protocol conversion and including a storage section, the switching device being connected to a gateway performing relay processing involving the communication protocol conversion, and includes the steps of managing data update of a target device mounted on the vehicle; receiving update data for the target device from the gateway or a different switching device disposed on an upstream side toward the gateway; holding the received update data in the storage section; and transmitting data to be relayed corresponding to the update data for the target device, which is connected to a different switching device disposed on a downstream side, to the different switching device disposed on the downstream side, and deleting the data to be relayed from the storage section at least after completing the update, in which in the step of managing data update, the storage section is caused to hold the update data for the target device, which is connected to the switching device not through the different switching device also after completing the update.

Owing to such a configuration in which the switching device thus holds, also after completing the update, the update data that is received from the gateway or the different switching device disposed on the upstream side and corresponds to the update data for the target device connected thereto not through a different switching device, the switching device can easily manage the data update of the target device, and since the update data is held in the switching device, the gateway can delete the update data. Furthermore, owing to the configuration in which the switching device transmits the data to be relayed to the different switching device disposed on the downstream side, the different switching device disposed on the downstream side can be caused to manage the data update of the target device by, for example, causing the different switching device disposed on the downstream side to hold the data to be relayed. Besides, owing to the configuration in which the data to be relayed is deleted from the storage section at least after completing the update, the consumption of the storage area in the switching device can be suppressed. Accordingly, while managing the data update of the target device in the in-vehicle communication system, the gateway can be prevented from running out of free space in the storage area.

(13) A communication control program according to an embodiment of the present disclosure is a communication control program to be employed in a gateway mounted on a vehicle and including a storage section, causing a computer to function as: a relay section performing relay processing involving communication protocol conversion; and a management section managing data update of a target device mounted on the vehicle, in which the relay section receives update data for the target device from an external device disposed outside the vehicle, the storage section holds the update data received by the relay section, the relay section transmits data to be relayed corresponding to the update data for the target device, which is connected to a switching device connected thereunder and performing relay processing not involving the communication protocol conversion, to the switching device, and the management section deletes the data to be relayed from the storage section at least after completing the update, and causes the storage section to hold, also after completing the update, the update data for the target device, which is to be connected to the gateway not through the switching device.

Owing to the configuration in which the gateway thus transmits the data to be relayed to the switching device, the switching device can be caused to manage the data update of the target device by, for example, causing the switching device to hold the data to be relayed. Besides, owing to the configuration in which the data to be relayed is deleted from the storage section at least after completing the update, the consumption of the storage area in the gateway can be suppressed. Furthermore, owing to the configuration in which the gateway holds, also after completing the update, the update data for the target device connected thereto not through the switching device, the data update of the target device can be easily managed. Accordingly, while managing the data update of the target device in the in-vehicle communication system, the gateway can be prevented from running out of free space in the storage area.

(14) A communication control program according to an embodiment of the present disclosure is a communication control program to be employed in a switching device mounted on a vehicle and including a storage section, causing a computer to function as: a switching section performing relay processing not involving communication protocol conversion; and a management section managing data update of a target device mounted on the vehicle, in which a gateway performing relay processing involving the communication protocol conversion is connected to the switching device, the switching section receives update data for the target device from the gateway or a different switching device disposed on an upstream side toward the gateway, the storage section holds the update data received by the switching section, the switching section transmits data to be relayed corresponding to the update data for the target device, which is connected to a different switching device disposed on a downstream side, to the different switching device disposed on the downstream side, and deletes the data to be relayed from the storage section at least after completing the update, and the management section causes the storage section to hold, also after completing the update, the update data for the target device, which is to be connected to the switching device not through the different switching device.

Owing to such a configuration in which the switching device thus holds, also after completing the update, the update data that is received from the gateway or the different switching device disposed on the upstream side and corresponds to the update data for the target device connected thereto not through a different switching device, the switching device can easily manage the data update of the target device, and since the update data is held in the switching device, the gateway can delete the update data. Furthermore, owing to the configuration in which the switching device transmits the data to be relayed to the different switching device disposed on the downstream side, the different switching device disposed on the downstream side can be caused to manage the data update of the target device by, for example, causing the different switching device disposed on the downstream side to hold the data to be relayed. Besides, owing to the configuration in which the data to be relayed is deleted from the storage section at least after completing the update, the consumption of the storage area in the switching device can be suppressed. Accordingly, while managing the data update of the target device in the in-vehicle communication system, the gateway can be prevented from running out of free space in the storage area.

Now, the embodiments of the present disclosure will be described with reference to the accompanying drawings. It is noted that like reference signs are used to refer to like or corresponding elements in these drawings so as to avoid repetition of the description. Besides, the following embodiments may be at least partially optionally combined.

[Configuration and Basic Operation]

FIG. 1 is a diagram illustrating the configuration of a comparative example of an in-vehicle communication system according to an embodiment of the present disclosure.

Referring to FIG. 1, an in-vehicle communication system 300 of the comparative example includes a gateway 101 and a plurality of in-vehicle devices 111. The in-vehicle communication system 300 is mounted on a vehicle 1. The gateway 101 includes a volatile memory (storage section) 24 and a non-volatile memory (storage section) 25.

The volatile memory 24 is, for example, a DRAM (Dynamic RAM). The non-volatile memory 25 is, for example, a flash memory.

The gateway 101 manages data update of a target device mounted on the vehicle 1. Specifically, the gateway 101 manages update of firmware used in each of the in-vehicle devices 111, that is, an example of the target device.

More specifically, the gateway 101 holds the firmware used in each in-vehicle device 111 also after completing the update, and performs, if necessary, recovery processing of the in-vehicle device 111 using the held firmware. Specifically, the gateway 101 restarts the in-vehicle device 111 of interest.

An external device 181 is, for example, a FOTA (Firmware On-The-Air) server, and is provided outside the vehicle 1. The external device 181 holds firmware of each version used in the in-vehicle devices 111.

A vehicle exterior communication device 111T corresponding to one of the in-vehicle devices 111 can perform wireless communication with a radio base station device 161 in accordance with communication standards for wide-area wireless communications such as LTE (Long Term Evolution) or 3G.

The vehicle exterior communication device 111T can communicate with the external device 181 disposed outside the vehicle 1 via the radio base station device 161.

Each in-vehicle device 111 is connected to the gateway 101 via either one of an Ethernet (registered trademark) cable 10 and a CAN bus 11. Here, the Ethernet cable 10 is a cable according to standards of Ethernet. The CAN bus 11 is a bus according to standards of CAN (Controller Area Network) (registered trademark).

Incidentally, each in-vehicle device 111 may be connected to the gateway 101 via a bus or a cable different from the CAN bus 11 and the Ethernet cable 10, such as a Flex Ray (registered trademark), MOST (Media Oriented Systems Transport) (registered trademark) or LIN (Local Interconnect Network) bus or cable.

The in-vehicle device 111 connected to the gateway 101 via the CAN bus 11 (hereinafter sometimes referred to as the CAN device) is, for example, an engine control device, an AT (Automatic Transmission) control device, an HEV (Hybrid Electric Vehicle) control device, a brake control device, a chassis control device, a steering control device or an instrument display control device.

The CAN device communicates with the gateway 101, for example, in accordance with the communication standards of CAN.

The in-vehicle device 111 connected to the gateway 101 via the Ethernet cable 10 (hereinafter sometimes referred to as the Ethernet device) is, for example, the vehicle exterior communication device 111T, a camera, a driving support device, a sensor or a navigation device, and communicates with the gateway 101 in accordance with the communication standards of Ethernet.

Each in-vehicle device 111 includes, for example, a non-volatile memory not shown for holding firmware, and operates in accordance with the firmware held in the non-volatile memory. Besides, the in-vehicle device 111 includes, for example, a volatile memory not shown for temporarily holding the firmware at the time of update of the firmware.

The gateway 101 is capable of performing relay processing involving communication protocol conversion. Specifically, for example, when data is received from the CAN device in accordance with the communication standards of CAN, the gateway 101 converts the format of the received data into a format according to the communication standards of Ethernet, and transmits the data having been converted in the format to the Ethernet device in accordance with the communication standards of Ethernet.

Alternatively, for example, when data is received from the Ethernet device in accordance with the communication standards of Ethernet, the gateway 101 converts the format of the received data into a format according to the communication standards of CAN, and transmits the data having been converted in the format to the CAN device in accordance with the communication standards of CAN.

Besides, the gateway 101 is capable of performing relay processing not involving the communication protocol conversion. Specifically, for example, when data is received from the CAN device in accordance with the communication standards of CAN, the gateway 101 transmits the received data to another CAN device in accordance with the communication standards of CAN.

Alternatively, when data is received from the Ethernet device in accordance with the communication standards of Ethernet, the gateway 101 transmits the received data to another Ethernet device in accordance with the communication standards of Ethernet.

In the non-volatile memory 25 of the gateway 101, the firmware currently used in each in-vehicle device 111 (hereinafter referred to also as the current firmware) is stored.

The external device 181 holds, for example, version information corresponding to the current version of the firmware used in each in-vehicle device 111.

[Operation Flow]

Each device included in the in-vehicle communication system 300 includes a computer, and an arithmetic processing unit such as a CPU of the computer reads, from a memory not shown, a program including some of or all of steps of a sequence diagram or a flow chart described below, and executes the program. Programs for these plural devices can be externally installed. The programs for these plural devices are respectively stored in recording media to be distributed.

Figure 2:
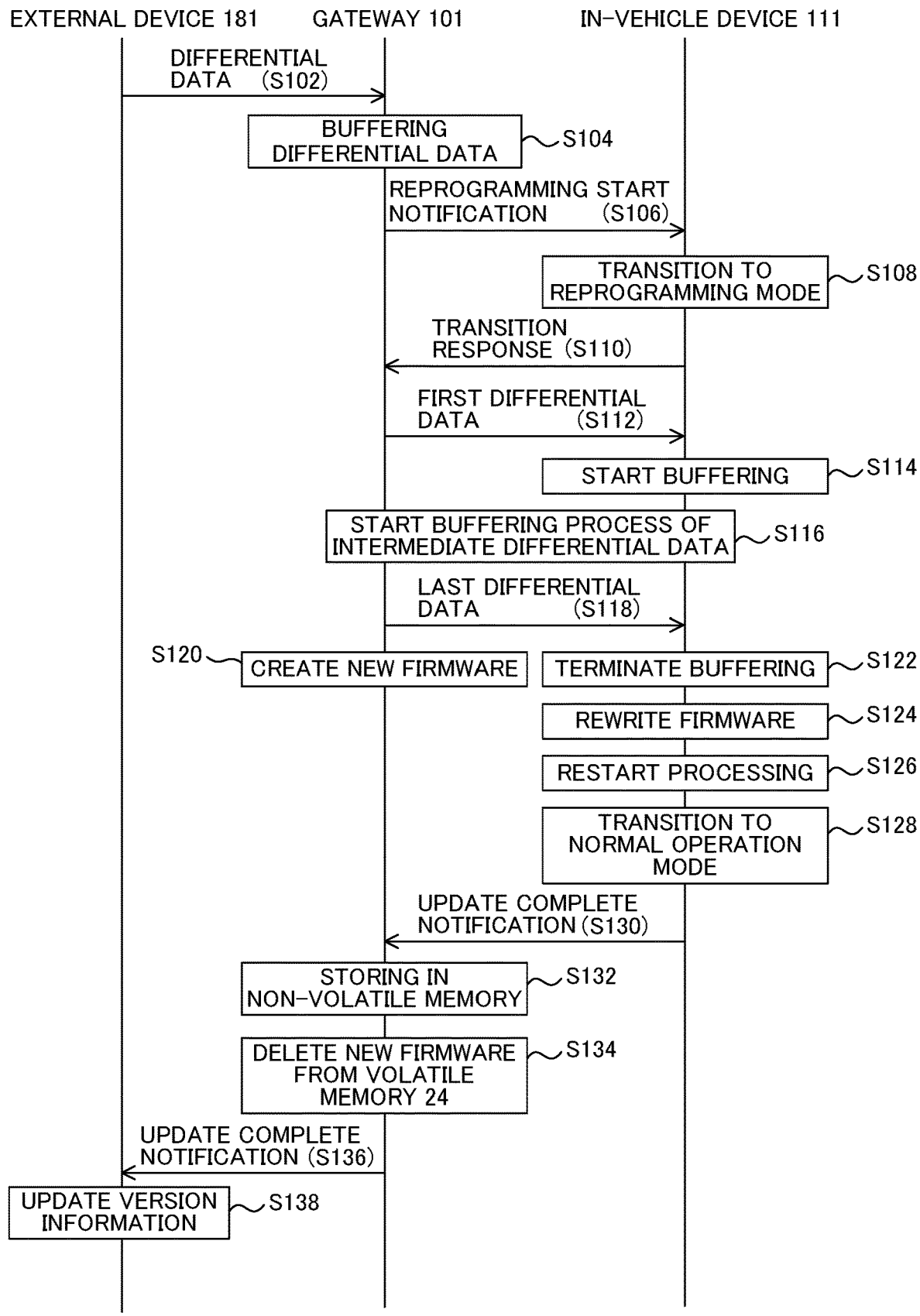
FIG. 2 is a diagram illustrating an example of a sequence employed in updating firmware in an in-vehicle device in the comparative example of the in-vehicle communication system according to the embodiment of the present disclosure.

FIG. 2 is a diagram illustrating an example of a sequence employed, in the comparative example of the in-vehicle communication system of the embodiment of the present disclosure, for updating the firmware of each in-vehicle device.

Referring to FIG. 2, the processing for updating the firmware in the in-vehicle device 111 is performed in the same manner no matter whether the in-vehicle device 111 is the CAN device or the Ethernet device.

First, for example, when the latest version of the firmware for the in-vehicle device 111 (hereinafter sometimes referred to as the new firmware) is prepared, the external device 181 transmits differential data between the new firmware and the current firmware as update data to the gateway 101 via the radio base station device 161 and the vehicle external communication device 111T (step S102).

When the differential data is received from the external device 181, the gateway 101 temporarily holds the received differential data in the volatile memory 24 (which operation hereinafter sometimes referred to as buffering) (step S104).

When the buffering has been normally completed, the gateway 101 transmits a reprogramming start notification corresponding to start of reprogramming to the in-vehicle device 111 (step S106).

When the reprogramming start notification is received from the gateway 101, the in-vehicle device 111 undergoes transition to a reprogramming mode for updating the firmware (step S108).

Next, the in-vehicle device 111 transmits, to the gateway 101, a transition response corresponding to the transition to the reprogramming mode (step S110).

When the transition response is received from the in-vehicle device 111, the gateway 101 recognizes that the firmware can be updated in the in-vehicle device 111, and transmits a first portion of the differential data (hereinafter also referred to as first differential data) to the in-vehicle device 111 (step S112).

When the first differential data is received from the gateway 101, the in-vehicle device 111 starts buffering of the differential data. More specifically, the in-vehicle device 111 buffers the received first differential data in the volatile memory (step S114).

Next, the gateway 101 transmits an intermediate portion of the differential data (hereinafter also referred to as the intermediate differential data), for example, dividedly to the in-vehicle device 111. The in-vehicle device 111 buffers, in the volatile memory, the intermediate differential data transmitted by the gateway 101 (step S116).

Next, the gateway 101 transmits a last portion of the differential data (hereinafter also referred to as the last differential data) to the in-vehicle device 111 (step S118).

When the last differential data is received from the gateway 101, the in-vehicle device 111 buffers the received last differential data in the volatile memory, and terminates the buffering of the differential data (step S122).

Besides, the gateway 101 acquires the current firmware from the non-volatile memory 25, creates the new firmware by adding the differential data to the acquired current firmware, and stores the new firmware in the volatile memory 24 (step S120).

Thereafter, the in-vehicle device 111 rewrites, by using the buffered differential data, the firmware stored in the non-volatile memory into the new firmware (step S124).

Next, the in-vehicle device 111 restarts with the new firmware (step S126).

When the in-vehicle device 111 has restarted successfully, it undergoes transition to a normal operation mode (step S128).

Next, the in-vehicle device 111 transmits, to the gateway 101, an update complete notification corresponding to successful update of the firmware (step S130).

When the update complete notification is received from the in-vehicle device 111, the gateway 101 deletes the current firmware from the non-volatile memory 25, and stores the created new firmware in the non-volatile memory 25 (step S132).

Then, the gateway 101 deletes the new firmware stored in the volatile memory 24 (step S134).

Next, the gateway 101 transmits the update complete notification to the external device 181 via the vehicle external communication device 111T and the radio base station device 161 (step S136).

When the update complete notification is received from the gateway 101, the external device 181 updates the version information based on the received update complete notification (step S138).

Incidentally, although the in-vehicle device 111 has successfully restarted in step S126 described above, the restart may fail in some cases.

In such a case, the gateway 101 restarts the in-vehicle device 111, for example, by using the current firmware. For this purpose, the current firmware is stored in the non-volatile memory 25 until the gateway 101 receives the update complete notification from the in-vehicle device 111.

Figure 3:
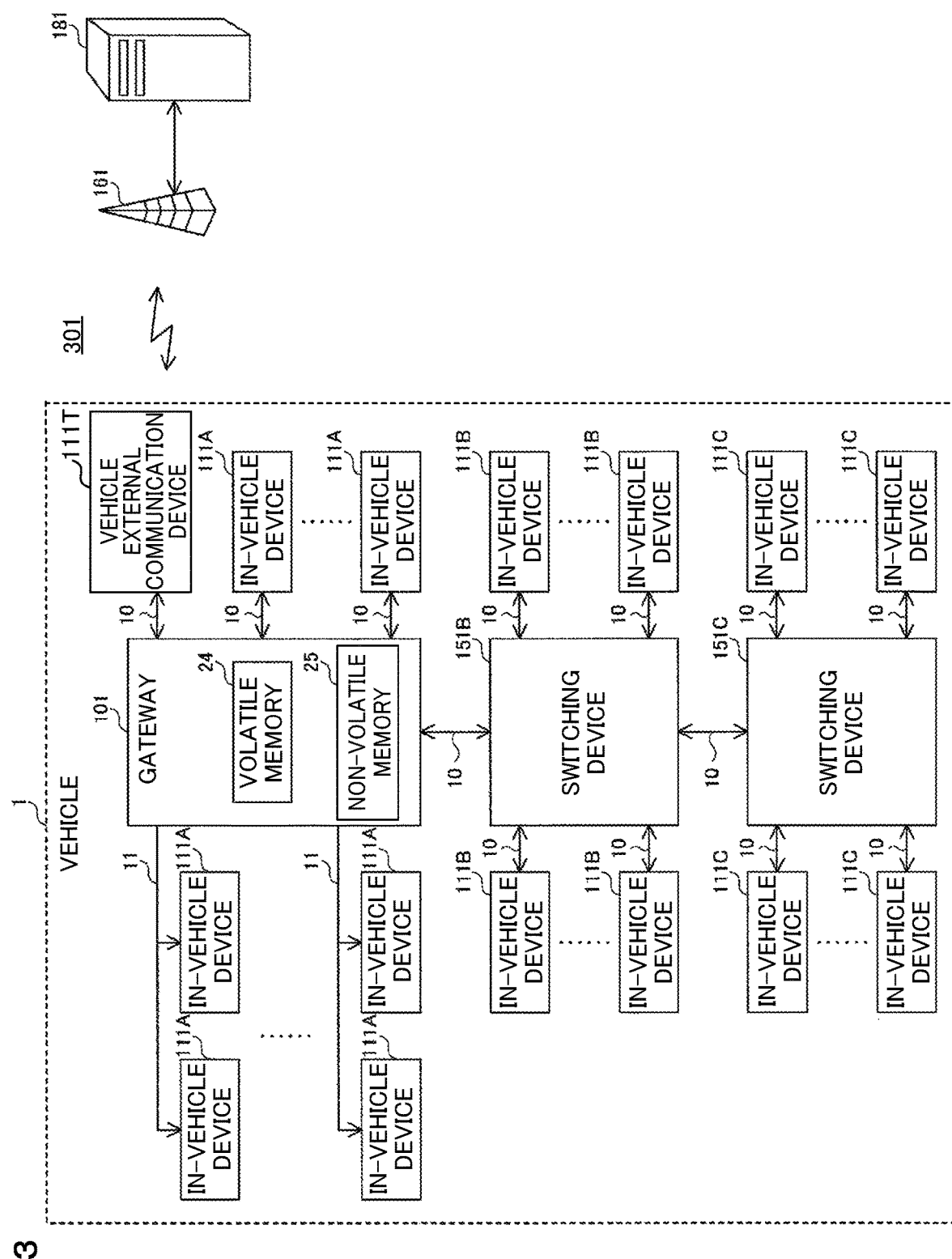
FIG. 3 is a diagram illustrating the configuration of the in-vehicle communication system according to the embodiment of the present disclosure.

FIG. 3 is a diagram illustrating the configuration of the in-vehicle communication system according to the embodiment of the present disclosure.

Referring to FIG. 3, an in-vehicle communication system 301 includes a gateway 101, and switching devices 151B and 151C. The in-vehicle communication system 301 is mounted on a vehicle 1. The vehicle 1 is provided with a plurality of in-vehicle devices 111.

The switching devices 151B and 151C are, for example, serially connected to each other. In other words, the switching devices 151B and 151C are cascade-connected to each other. In the following description, each of the switching devices 151B and 151C is sometimes referred to as the switching device 151.

To the gateway 101, a plurality of in-vehicle devices 111A corresponding to the in-vehicle devices 111 are connected via either of an Ethernet cable 10 or a the CAN bus 11, and the switching device 151B is connected via the Ethernet cable 10.

To the switching device 151B, a plurality of in-vehicle devices 111B corresponding to the in-vehicle devices 111 are connected via the Ethernet cables 10, and the switching device 151C is connected via the Ethernet cable 10.

To the switching device 151C, a plurality of in-vehicle devices 111C corresponding to the in-vehicle devices 111 are connected via the Ethernet cables 10.

The switching devices 151B and 151C communicate with the devices connected thereto via the Ethernet cables 10 in accordance with the communication standards of Ethernet.

Here, being connected "under" the gateway 101 is defined as being connected in such a manner that update data from the external device 181 can be received via the gateway 101.

Besides, a "device disposed on an upstream side" from a "given device" in the vehicle 1 is defined as a device disposed on a side closer to the external device 181 beyond the "given device" on a data transmission path between the "given device" and the external device 181. Furthermore, a "device disposed on a downstream side" from a "given device" in the vehicle 1 is defined as a device to which data from the external device 181 is relayed by the "given device".

Incidentally, although a plurality of in-vehicle devices 111 are connected to each of the gateway 101, the switching device 151B and the switching device 151C, the present disclosure is not limited to this configuration. Each of the gateway 101, the switching device 151B and the switching device 151C may be connected to one in-vehicle device 111.

[Problems]

When a plurality of switching devices 151 are connected under the gateway 101 as illustrated in FIG. 3, the number of in-vehicle devices 111 included in the in-vehicle communication system 301 is increased.

For example, in the case where the gateway 101 manages the respective in-vehicle devices 111 connected thereto not through the switching devices 151 and the respective in-vehicle devices 111 connected to the switching devices 151 connected under the gateway, the gateway 101 is required to hold the firmware used in each of these in-vehicle devices 111 also after completing the update. When the number of the in-vehicle devices 111 is increased, however, the gateway 101 may run out of a storage area for holding the firmware therein in some cases.

In such a case, it is difficult for the gateway 101 to manage the data update of each of the in-vehicle devices 111.

Therefore, in the in-vehicle communication system according to the embodiment of the present disclosure, this problem is solved by employing the following configuration and operation.

[Proxy Method]

Figure 4:
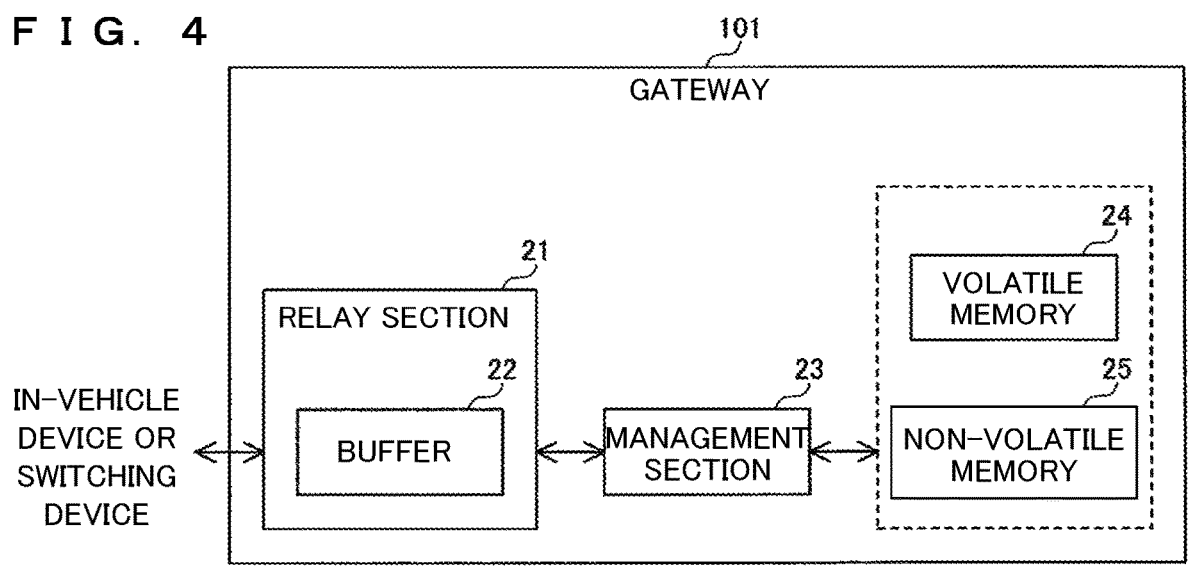
FIG. 4 is a diagram illustrating the configuration of a gateway included in the in-vehicle communication system according to the embodiment of the present disclosure.

FIG. 4 is a diagram illustrating the configuration of the gateway included in the in-vehicle communication system according to the embodiment of the present disclosure.

Referring to FIG. 4, the gateway 101 includes a relay section 21, a management section 2, a volatile memory (storage section) 24 and a non-volatile memory (storage section) 25. The relay section 21 includes a buffer (storage section) 22.

The buffer 22, the volatile memory 24 and the non-volatile memory 25 hold differential data received by the relay section 21.

More specifically, the buffer 22 included in the relay section 21 is used for temporarily storing data to be relayed by the relay section 21. The volatile memory 24 is used as a temporary storage area for the differential data and as a work area for creation of firmware or the like by the management section 23. The non-volatile memory 25 stores current firmware of the in-vehicle device 111 managed by the own gateway 101.

The relay section 21 is capable of performing relay processing involving the communication protocol conversion. Besides, the relay section 21 transmits, to the switching device 151 connected under the own gateway 101, namely, connected on the downstream side, the data to be relayed corresponding to update data for the in-vehicle device 111 connected to this switching device 151.

More specifically, the relay section 21 respectively receive differential data for the in-vehicle devices 111A to 111C via the radio base station device 161 from the external device 181, and stores the received differential data in the buffer 22. Then, the relay section 21 outputs the differential data thus stored in the buffer 22 to the management section 23.

On the other hand, for example, when the relay section 21 receives data different from the differential data from another device, it stores the received data in the buffer 22. Then, the relay section 21 transmits the data thus stored in the buffer 22 to a device corresponding to the destination of the data.

The management section 23 manages the data update of target devices mounted on the vehicle 1. Specifically, the management section 23 manages the firmware of the in-vehicle devices 111A.

More specifically, when the differential data is received from the relay section 21, the management section 23 buffers the received differential data in the volatile memory 24.

When the differential data thus buffered in the volatile memory 24 is the data to be relayed, the management section 23 transmits the data to be relayed via the relay section 21 to the switching device 151 connected thereunder.

After transmitting the data to be relayed, the management section 23 causes the volatile memory 24 to hold the data to be relayed until an update complete notification is received via the relay section 21 from the switching device 151 connected thereunder.

The management section 23 deletes the data to be relayed from the volatile memory 24 at least after completing the update. Specifically, when the update complete notification is received via the relay section 21, the management section 23 deletes the data to be relayed from the volatile memory 24.

Besides, the management section 23 causes the non-volatile memory 25 to hold, even after completing the update, the update data for the in-vehicle device 111A connected to the own gateway 101 not through the switching device 151.

More specifically, when the differential data buffered in the volatile memory 24 is differential data for the in-vehicle device 111A (hereinafter sometimes also referred to as the own differential data), the management section 23 performs the following processing.

The management section 23 updates the firmware of the in-vehicle device 111A by, for example, transmitting the own differential data via the relay section 21 to the in-vehicle device 111A. Besides, the management section 23 creates new firmware, for example, based on the firmware held before the update stored in the non-volatile memory 25, namely, the current firmware, and the own differential data, and stores the new firmware in the volatile memory 24.

The management section 23 moves the new firmware held in the volatile memory 24 to the non-volatile memory 25 and deletes the current firmware from the non-volatile memory 25, for example, when the data update is completed.

Besides, the management section 23 instructs, for example, the switching device 151 managing the data update to perform the data update of the in-vehicle device 111. Specifically, the management section 23 transmits, via the relay section 21 to the switching device 151, a reprogramming request for instructing the data update of the in-vehicle device 111.

Figure 5:
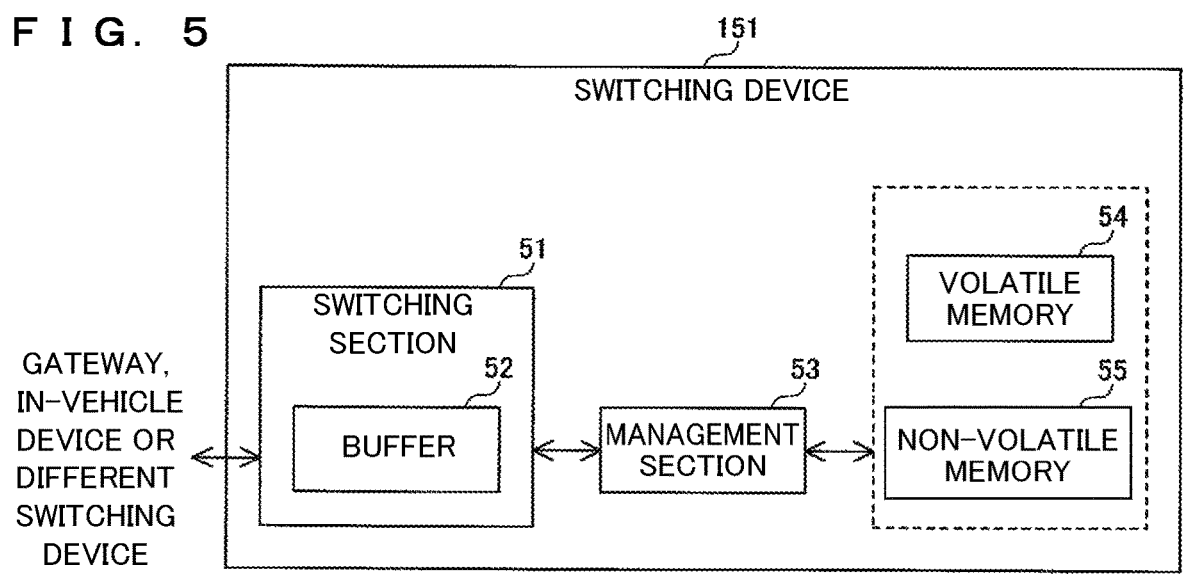
FIG. 5 is a diagram illustrating the configuration of a switching device included in the in-vehicle communication system according to the embodiment of the present disclosure.

FIG. 5 is a diagram illustrating the configuration of the switching device included in the in-vehicle communication system according to the embodiment of the present disclosure.

Referring to FIG. 5, the switching device 151 includes a switching section 51, a management section 53, a volatile memory (storage section) 54 and a non-volatile memory (storage section) 55. The switching section 51 includes a buffer (storage section) 52.

The buffer 52, the volatile memory 54 and the non-volatile memory 55 hold differential data received by the switching section 51.

More specifically, the buffer 52 included in the switching section 51 is used for temporarily storing data to be relayed by the switching section 51. The volatile memory 54 is used as a temporary storage area for the differential data and as a work area for creation of firmware or the like by the management section 53. The non-volatile memory 55 stores the current firmware of the in-vehicle device 111 managed by the own switching device 151.

The switching section 51 performs relay processing not involving the protocol conversion. Specifically, for example, when data is received from another device in accordance with the communication standards of Ethernet, the switching section 51 stores the received data in the buffer 52.

Then, the switching section 51 transmits the data thus stored in the buffer 52 to a device corresponding to the destination of the data in accordance with the communication standards of Ethernet.

Specifically, the switching section 51 receives differential data from, for example, the gateway 101 or a different switching device 151 disposed on the upstream side between the gateway 101 and the own switching device 151, and stores the received differential data in the buffer 52.

When the differential data thus stored in the buffer 52 is data to be relayed corresponding to differential data for the in-vehicle device 111 connected to a different switching device 151 disposed on the downstream side, the switching section 51 transmits the data to be relayed to the different switching device 151 disposed on the downstream side, and deletes the data to be relayed from the buffer 52 at least after completing the update.

More specifically, the switching section 51 deletes the data to be relayed from the buffer 52, for example, immediately after transmitting the data to be relayed to the different switching device 151 disposed on the downstream side.

On the other hand, when the differential data stored in the buffer 52 is differential data for the in-vehicle device 111 connected to the own switching device 151 not through a different switching device 151, namely, the own differential data, the switching section 51 acquires the own differential data from the buffer 52 to output it to the management section 53.

The management section 53 manages the data update of the target device mounted on the vehicle 1. Specifically, the management section 53 manages the firmware of the in-vehicle device 111 connected to the own switching device 151 not through a different switching device 151.

Specifically, the management section 53 causes the non-volatile memory 55 to hold the firmware created based on the own differential data also after completing the update.

More specifically, when a reprogramming request is received, for example, from the gateway 101 via the switching section 51, the management section 53 starts reprogramming processing for the in-vehicle device 111.

When the own differential data is received from the switching section 51 in the reprogramming processing, the management section 53 stores the received own differential data in the volatile memory 54.

The management section 53 updates the firmware of the in-vehicle device 111 connected to the own switching device 151 by, for example, transmitting the own differential data to the in-vehicle device 111 via the switching section 51. Besides, the management section 53 creates the new firmware based on, for example, the firmware held before the update stored in the non-volatile memory 55, namely, the current firmware, and the own differential data, and stores the new firmware in the volatile memory 54.

For example, when the data update is completed, the management section 53 deletes the firmware held before the update from the non-volatile memory 55, and performs processing Pa for causing the non-volatile memory 55 to hold the firmware after the update.

More specifically, the management section 53 moves, for example, the new firmware held in the volatile memory 54 to the non-volatile memory 55, and deletes the current firmware from the non-volatile memory 55.

Besides, in the case where the in-vehicle device 111 has failed to restart with the new firmware and the data update has not been successfully completed, the management section 53 performs processing for restarting the in-vehicle device 111 with the current firmware stored in the non-volatile memory 55.

[Operation Flow]

Figure 6:
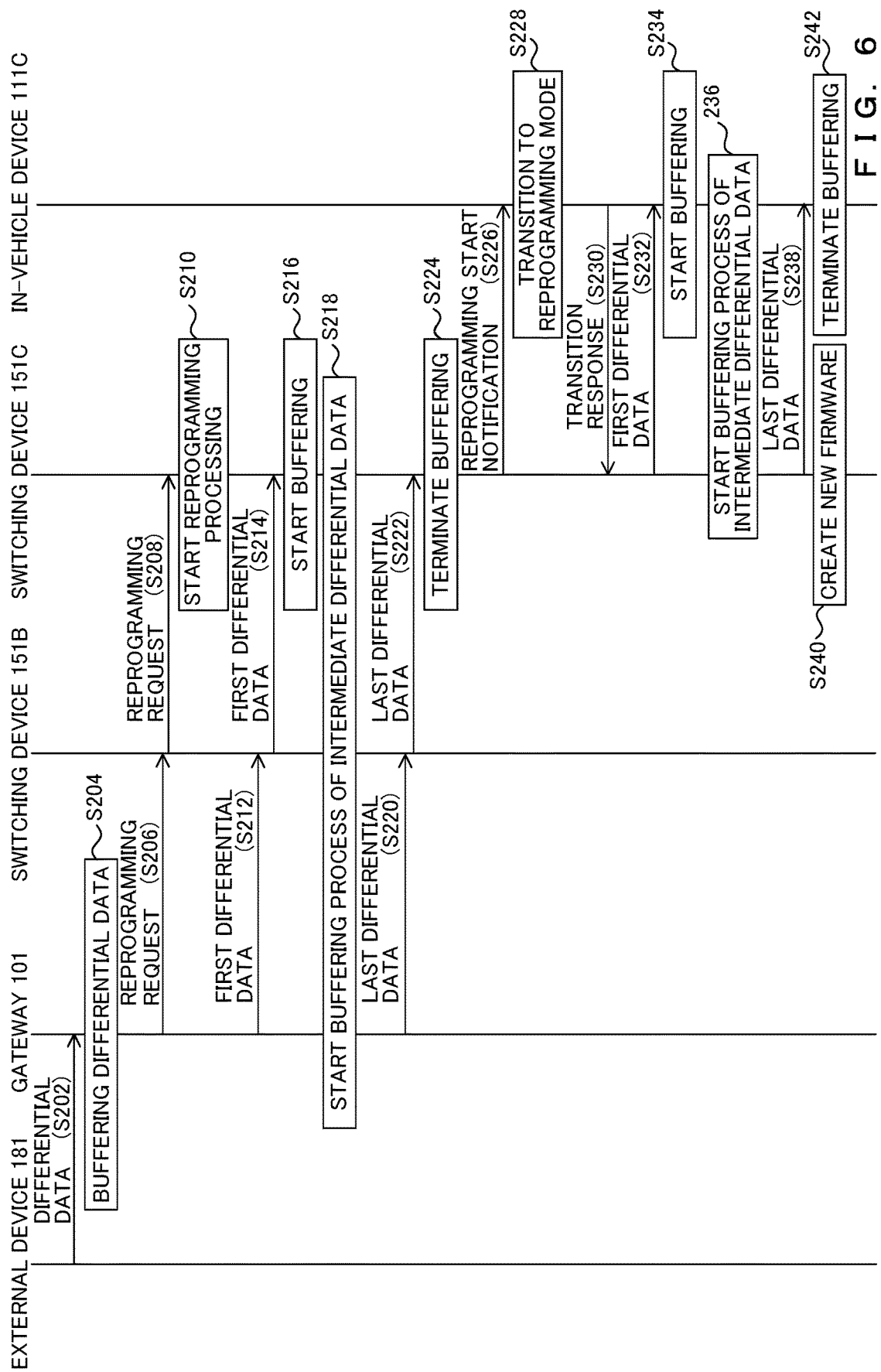
FIG. 6 is a diagram illustrating an example of a sequence employed in updating firmware in an in-vehicle device by a proxy method in the in-vehicle communication system according to the embodiment of the present disclosure.
Figure 7:
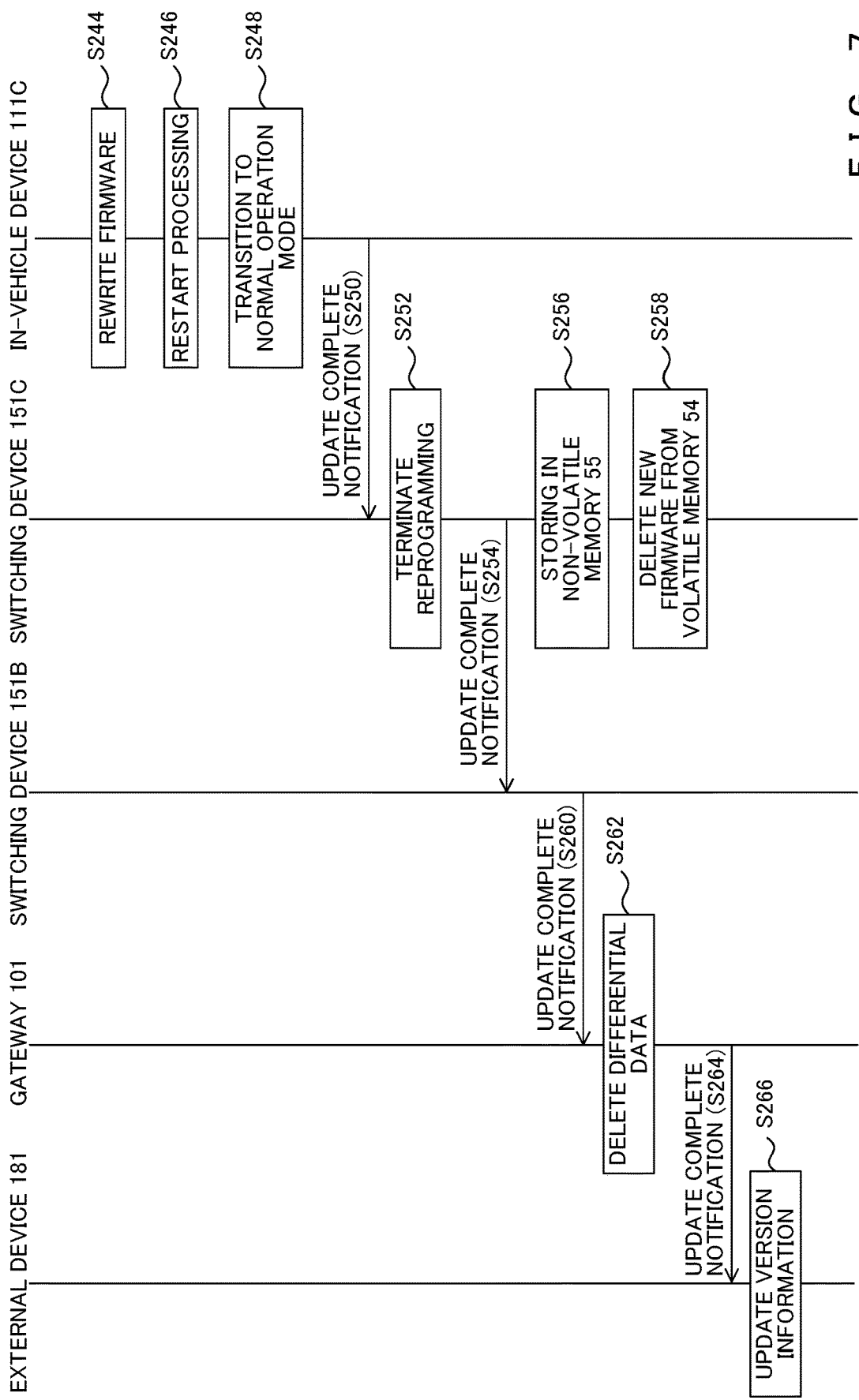
FIG. 7 is another diagram illustrating the example of the sequence employed in updating the firmware in the in-vehicle device by the proxy method in the in-vehicle communication system according to the embodiment of the present disclosure.

FIGS. 6 and 7 are diagrams illustrating an example of a sequence employed in updating the firmware of the in-vehicle device by the proxy method in the in-vehicle communication system according to the embodiment of the present disclosure. The sequence of FIG. 7 follows that of FIG. 6.

Referring to FIGS. 3 to 7, it is assumed that the firmware of the in-vehicle device 111C connected to the switching device 151C is to be updated.

First, for example, when new firmware for the in-vehicle device 111C is ready, the external device 181 transmits differential data between the new firmware and the current firmware as update data to the gateway 101 via the radio base station device 161 and the vehicle external communication device 111T (step S202).

When the differential data is received from the external device 181, the gateway 101 buffers the received differential data in the volatile memory 54 (step S204).

When the buffering is normally completed, the gateway 101 transmits, to the switching device 151B, a reprogramming request for the switching device 151C for instructing the data update of the in-vehicle device 111C (step S206).

When the reprogramming request is received from the gateway 101, the switching device 151B relays and transmits the received reprogramming request to the switching device 151C (step S208).

When the reprogramming request is received from the switching device 151B, the switching device 151C starts the reprogramming processing in accordance with the received reprogramming request (step S210).

Next, the gateway 101 transmits first differential data for the switching device 151C to the switching device 151B (step S212).

When the first differential data is received from the gateway 101, the switching device 151B relays and transmits the received first differential data to the switching device 151C (step S214).

When the first differential data is received from the switching device 151B, the switching device 151C starts buffering of the differential data. More specifically, the switching device 151C buffers the received first differential data in the volatile memory 54 (step S216).

Next, the gateway 101 transmits intermediate differential data, for example, dividedly to the switching device 151C via the switching device 151B. The switching device 151C buffers, in the volatile memory 54, the intermediate differential data transmitted by the gateway 101 (step S218).

Next, the gateway 101 transmits last differential data for the switching device 151C to the switching device 151B (step S220).

When the last differential data is received from the gateway 101, the switching device 151B relays and transmits the received last differential data to the switching device 151C (step S222).

When the last differential data is received from the switching device 151B, the switching device 151C buffers the received last differential data in the volatile memory 54, and terminates the buffering of the differential data (step S224).

Next, the switching device 151C transmits a reprogramming start notification to the in-vehicle device 111C (step S226).

When the reprogramming start notification is received from the switching device 151C, the in-vehicle device 111C undergoes transition to a reprogramming mode (step S228).

Next, the in-vehicle device 111C transmits a transition response to the switching device 151C (step S230).

When the transition response is received from the in-vehicle device 111C, the switching device 151C recognizes that the firmware can be updated in the in-vehicle device 111C, and transmits the first differential data to the in-vehicle device 111C (step S232).

When the first differential data is received from the switching device 151C, the in-vehicle device 111C starts buffering of the differential data. More specifically, the in-vehicle device 111C buffers the received first differential data in the volatile memory (step S234).

Next, the switching device 151C transmits intermediate differential data, for example, dividedly to the in-vehicle device 111C. The in-vehicle device 111C buffers, in the volatile memory, the intermediate differential data transmitted by the switching device 151C (step S236).

Next, the switching device 151C transmits last differential data to the in-vehicle device 111C (step S238).

When the last differential data is received from the switching device 151C, the in-vehicle device 111C buffers the received last differential data in the volatile memory, and terminates the buffering of the differential data (step S242).

Besides, the switching device 151C acquires the current firmware from the non-volatile memory 55, creates new firmware by adding the differential data to the acquired current firmware, and stores the new firmware in the volatile memory 54 (step S240).

Next, the in-vehicle device 111C rewrites, by using the buffered differential data, the firmware stored in the non-volatile memory into the new firmware (step S244).

Then, the in-vehicle device 111C restarts with the new firmware (step S246).

When the restart is successful, the in-vehicle device 111C undergoes transition to the normal operation mode (step S248).

Next, the in-vehicle device 111C transmits an update complete notification to the switching device 151C (step S250).

When the update complete notification is received from the in-vehicle device 111C, the switching device 151C recognizes that the update of the firmware is successfully completed in the in-vehicle device 111C, and terminates the reprogramming processing (step S252).

Next, the switching device 151C transmits, to the switching device 151B, the update complete notification for the gateway 101 (step S254).

Then, the management section 53 of the switching device 151C deletes the current firmware from the non-volatile memory 55, and stores, in the non-volatile memory 55, the new firmware stored in the volatile memory 54 (step S256).

Next, the management section 53 of the switching device 151C deletes the new firmware stored in the volatile memory 54 (step S258).

Besides, when the update complete notification is received from the switching device 151C, the switching device 151B relays and transmits the received update complete notification to the gateway 101 (step S260).

When the update complete notification is received from the switching device 151B via the relay section 21, the management section 23 of the gateway 101 deletes the differential data from the volatile memory 24 (step S262).

Next, the gateway 101 transmits the update complete notification to the external device 181 via the vehicle exterior communication device 111T and the radio base station device 161 (step S264).

When the update complete notification is received from the gateway 101, the external device 181 updates the version information based on the received update complete notification (step S266).

Incidentally, although the in-vehicle device 111C is successfully restarted in step S246 described above, the restart may fail in some cases.

In such a case, the switching device 151C restarts the in-vehicle device 111C, for example, by using the current firmware. For this purpose, the current firmware is stored in the non-volatile memory 25 until the switching device 151C receives the update complete notification from the in-vehicle device 111C.

Besides, although the switching device 151C deletes the current firmware and stores the new firmware in steps S256 and S258 in the above-described configuration, this configuration does not limit the invention. The switching device 151C may have a configuration in which the current firmware is deleted and the new firmware is stored before confirming the receipt of the update complete notification transmitted from the in-vehicle device 111C (step S252).

Besides, although the switching device 151C deletes the current firmware from the non-volatile memory 55 in step S256 in the above-described configuration, this configuration does not limit the invention. The switching device 151C may have a configuration in which the current firmware is not deleted. More specifically, the switching device 151C may store a prescribed number of latest firmware so that the oldest firmware be deleted if the number of firmware to be stored therein exceeds the prescribed number.

[Modification of Proxy Method]

The management section 53 of the switching device 151C performs the processing Pa, for example, when a prescribed condition C1 is satisfied after completing the data update.

Here, the prescribed condition C1 is, for example, that a communication rate of the switching device 151C becomes lower than a prescribed value.

In other words, the configuration is not limited to, for example, one in which the management section 53 creates the new firmware, stores the new firmware in the non-volatile memory 55 and deletes the new firmware from the volatile memory 54 respectively in steps S240, S256 and S258 as described above, but these processing may be performed when the prescribed condition C1 is satisfied.

Specifically, the management section 53 performs these processing, for example, when the communication rate of the own switching device 151C is lower than the prescribed value. More specifically, for example, when the vehicle 1 is stopped, frequency of data transfer for automatic driving is reduced, and therefore, the communication rate of the switching device 151C becomes lower than the prescribed value and thus, the prescribed condition C1 is satisfied.

[Hook Method]

Referring to FIG. 4 again, the configuration in which the switching device 151 manages the data update of the in-vehicle device 111 connected thereto not through a different switching device 151 is employed in the proxy method, and the present disclosure is not limited to this configuration. A configuration in which the gateway 101 manages the data update of, for example, the in-vehicle device 111 connected to the switching device 151 connected under the gateway 101 may be employed.

An example of such management of the data update includes a hood method. In the hook method, when the differential data buffered in the volatile memory 24 is the data to be relayed, the management section 23 of the gateway 101 transmits the differential data to the corresponding in-vehicle device 111 via the relay section 21.

Referring to FIG. 5 again, the switching device 151 connected under the gateway 101 monitors, for example, data transmitted or received therethrough between the gateway 101 and the target devices, and holds the update data to be transmitted therethrough from the gateway 101 to the target device connected thereto.

Besides, when the update complete notification to be transmitted from the target device connected thereto to the gateway 101 is detected, the switching device 151 connected thereunder performs the processing Pa for discarding the update data held before the update and holding the update data of after the update.

More specifically, the management section 53 of the switching device 151 connected thereunder monitors, for example, the buffer 52 of the switching section 51. When the differential data to be transmitted from the gateway 101 to the in-vehicle device 111 connected to the own switching device 151, namely, the own differential data, is detected, the management section 53 acquires the detected own differential data and causes the volatile memory 54 to hold the acquired own differential data.

The management section 53 creates the new firmware based on the firmware held before the update stored in the non-volatile memory 55, namely, the current firmware, and the own differential data, and stores the new firmware in the volatile memory 54.

Besides, the management section 53 monitors the buffer 52 of the switching section 51, and when the update complete notification to be transmitted from the in-vehicle device 111 connected to the own switching device 151 to the gateway 101 is detected, the management section 53 moves the new firmware held in the volatile memory 54 to the non-volatile memory 55, and deletes the current firmware from the non-volatile memory 55.

[Operation Flow]

Figure 8:
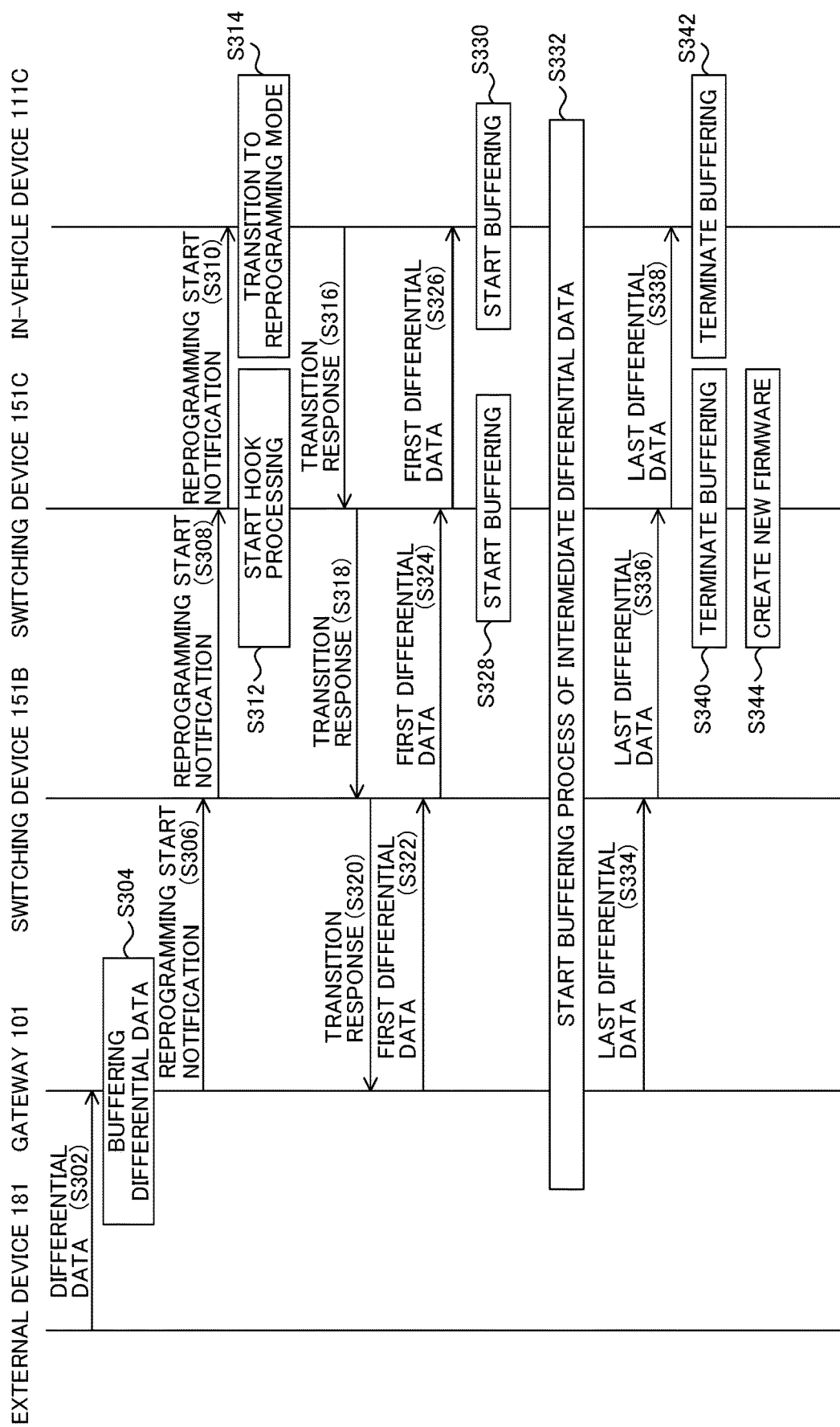
FIG. 8 is a diagram illustrating an example of a sequence employed in updating the firmware in the in-vehicle device by a hook method in the in-vehicle communication system according to the embodiment of the present disclosure.
Figure 9:
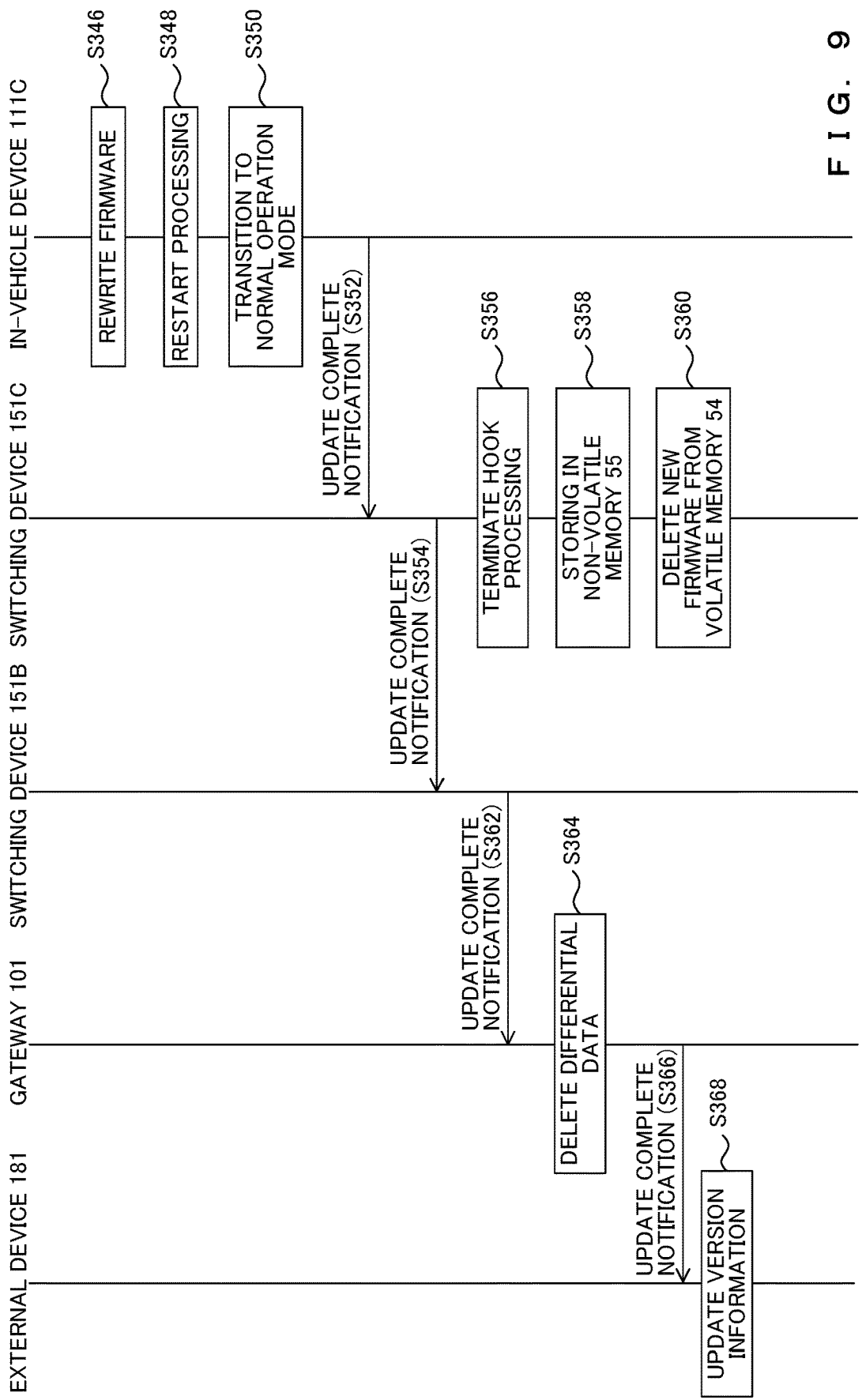
FIG. 9 is another diagram illustrating the example of the sequence employed in updating the firmware in the in-vehicle device by the hood method in the in-vehicle communication system according to the embodiment of the present disclosure.

FIGS. 8 and 9 are diagrams illustrating an example of a sequence employed in updating the firmware in the in-vehicle device by the hook method in the in-vehicle communication system according to the embodiment of the present disclosure. The sequence of FIG. 9 follows that of FIG. 8.

Referring to FIGS. 3 to 5, 8 and 9, it is assumed that the firmware of the in-vehicle device 111C connected to the switching device 151C is to be updated.

First, for example, when new firmware for the in-vehicle device 111C is ready, the external device 181 transmits differential data between the new firmware and the current firmware as update data to the gateway 101 via the radio base station device 161 and the vehicle external communication device 111T (step S302).

When the differential data is received from the external device 181, the gateway 101 buffers the received differential data in the volatile memory 54 (step S304).

When the buffering is normally completed, the gateway 101 transmits, to the switching device 151B, a reprogramming start notification for the in-vehicle device 111C (step S306).

When the reprogramming start notification is received from the gateway 101, the switching device 151B relays and transmits the received reprogramming start notification to the switching device 151C (step S308).

When the reprogramming start notification is received from the switching device 151B, the switching device 151C relays and transmits the received reprogramming start notification to the in-vehicle device 111C (step S310).

Next, the management section 53 of the switching device 151C monitors the buffer 52 of the switching section 51, and when it is detected that the switching section 51 has relayed the reprogramming start notification for the in-vehicle device 111C, hook processing is started (step S312).

Besides, when the reprogramming start notification is received from the switching device 151C, the in-vehicle device 111C undergoes transition to the reprogramming mode (step S314).

Next, the in-vehicle device 111C transmits, to the switching device 151C, a transition response for the gateway 101 corresponding to the transition to the reprogramming mode (step S316).

When the transition response is received from the in-vehicle device 111C, the switching device 151C relays and transmits the received transition response to the switching device 151B (step S318).

When the transition response is received from the switching device 151C, the switching device 151B relays and transmits the received transition response to the gateway 101 (step S320).

When the transition response is received from the switching device 151B, the gateway 101 recognizes that the firmware can be updated in the in-vehicle device 111C, and transmits the first differential data for the in-vehicle device 111C to the switching device 151B (step S322).

When the first differential data is received from the gateway 101, the switching device 151B relays and transmits the received first differential data to the switching device 151C (step S324).

When the first differential data is received from the switching device 151B, the switching device 151C relays and transmits the received first differential data to the in-vehicle device 111C (step S326).

Next, the management section 53 of the switching device 151C monitors the buffer 52 of the switching section 51, and when it is detected that the switching section 51 has relayed the first differential data, the buffering of the differential data is started. More specifically, the management section 53 acquires the detected first differential data and buffers it in the volatile memory 54 (step S328).

When the first differential data is received from the switching device 151C, the in-vehicle device 111C starts the buffering of the differential data. More specifically, the in-vehicle device 111C buffers the received first differential data in the volatile memory (step S330).

Next, the gateway 101 transmits the intermediate differential data, for example, dividedly to the in-vehicle device 111C via the switching device 151B and the switching device 151C. The switching device 151C and the in-vehicle device 111C buffer the intermediate differential data transmitted by the gateway 101 (step S332).

Next, the gateway 101 transmits the last differential data for the in-vehicle device 111C to the switching device 151B (step S334).

When the last differential data is received from the gateway 101, the switching device 151B relays and transmits the received last differential data to the switching device 151C (step S336).

When the last differential data is received from the switching device 151B, the switching device 151C relays and transmits the received last differential data to the in-vehicle device 111C (step S338).

Next, the management section 53 of the switching device 151C monitors the buffer 52 of the switching device 51, and when it is detected that the switching section 51 has relayed the last differential data, the management section 53 acquires the detected last differential data to buffer it in the volatile memory 54, and terminates the buffering of the differential data (step S340).

Besides, when the last differential data is received from the switching device 151C, the in-vehicle device 111C buffers the received last differential data in the volatile memory, and terminates the buffering of the differential data (step S342).

Next, the switching device 151C acquires the current firmware from the non-volatile memory 55, creates the new firmware by adding the differential data to the acquired current firmware, and stores the new firmware in the volatile memory 54 (step S344).

Besides, the in-vehicle device 111C rewrites, into the new firmware, the firmware stored in the non-volatile memory by using the buffered differential data (step S346).

Next, the in-vehicle device 111C restarts with the new firmware (step S348).

When the restart is successful, the in-vehicle device 111C undergoes transition to the normal operation mode (step S350).

Next, the in-vehicle device 111C transmits, to the switching device 151C, an update complete notification for the gateway 101 (step S352).

When the update complete notification is received from the in-vehicle device 111C, the switching device 151C relays and transmits the received update complete notification to the switching device 151B (step S354).

Next the management section 53 of the switching device 151C monitors the buffer 52 of the switching section 51, and when it is detected that the switching section 51 has relayed the update complete notification, the management section 53 recognizes that the update of the firmware has been successfully completed in the in-vehicle device 111C, and terminates the hook processing (step S356).

Next, the management section 53 of the switching device 151C deletes the current firmware from the non-volatile memory 55, and stores, in the non-volatile memory 55, the new firmware stored in the volatile memory 54 (step S358).

Next, the management section 53 of the switching device 151C deletes the new firmware stored in the volatile memory 54 (step S360).

Besides, when the update complete notification is received from the switching device 151C, the switching device 151B relays and transmits the received update complete notification to the gateway 101 (step S362).

When the update complete notification is received via the relay section 21 from the switching device 151B, the management section 23 of the gateway 101 deletes the differential data from the volatile memory 24 (step S364).

Next, the gateway 101 transmits the update complete notification to the external device 181 via the vehicle exterior communication device 111T and the radio base station device 161 (step S366).

When the update complete notification is received from the gateway 101, the external device 181 updates the version information based on the received update complete notification (step S368).

Besides, although the switching device 151C deletes the current firmware and stores the new firmware in steps S358 and S360 in the above-described configuration, this configuration does not limit the present disclosure. The switching device 151C may have a configuration in which the current firmware is deleted and the new firmware is stored before confirming the receipt of the update complete notification transmitted from the in-vehicle device 111C (step S356).

Besides, although the switching device 151C deletes the current firmware from the non-volatile memory 55 in step S358 in the above-described configuration, this configuration does not limit the present disclosure. The switching device 151C may have a configuration in which the current firmware is not deleted. More specifically, the switching device 151C may store a prescribed number of latest firmware so that the oldest firmware be deleted if the number of firmware to be stored therein exceeds the prescribed number.

[Modification of Hook Method]

The management section 53 of the switching device 151C performs the above-described processing Pa, for example, when the above-described prescribed condition C1 is satisfied after completing the data update.

In other words, the configuration is not limited to, for example, one in which the management section 53 creates the new firmware, stores the new firmware in the non-volatile memory 55 and deletes the new firmware from the volatile memory 54 respectively in steps S344, S358 and S360 as described above, but these processing may be performed when the prescribed condition C1 is satisfied.

Incidentally, the in-vehicle communication system according to the embodiment of the present disclosure has the configuration including the two switching devices 151, which does not limit the present disclosure. The in-vehicle communication system 301 may have a configuration including one switching device 151, or including three or more switching devices 151.

Besides, the in-vehicle communication system according to the embodiment of the present disclosure has the configuration in which the external device 181 transmits differential data to the gateway 101, which does not limit the present disclosure. A configuration in which the external device 181 transmits the whole new firmware instead of the differential data to the gateway 101 may be employed.

Furthermore, the in-vehicle communication system according to the embodiment of the present disclosure has the configuration in which the firmware of the in-vehicle device 111 is updated by either one of the proxy method and the hook method, which does not limit the present disclosure. The in-vehicle communication system 301 may employ a configuration in which the firmware of the in-vehicle device 111 is updated by a method different from the proxy method and the hook method.

Besides, the in-vehicle communication system according to the embodiment of the present disclosure has the configuration in which the gateway 101 deletes the differential data after receiving the update complete notification, which does not limit the present disclosure. A configuration in which the gateway 101 deletes the differential data after transmitting the whole differential data and before receiving the update complete notification may be employed.

Furthermore, the in-vehicle communication system according to the embodiment of the present disclosure employs the configuration in which the switching devices 151B and 151C are serially connected to each other, which does not limit the present disclosure. The in-vehicle communication system 301 may employ a configuration in which a plurality of switching devices 151 are connected in parallel.

In the vehicle relay device described in Patent Literature 1, a program and the like stored in the vehicle electronic control unit is stored in the flash ROM. In such a vehicle network, a switching device is provided, for example, under the vehicle relay device in some cases. In such a configuration, for example, when a large number of vehicle electronic control units are connected to the switching device, the memory usage of the flash ROM may be increased and hence it may run out of free space in some cases.

On the contrary, the in-vehicle communication system according to the embodiment of the present disclosure is an in-vehicle communication system mounted on the vehicle 1, and includes the gateway 101 capable of performing the relay processing involving the communication protocol conversion, and one or a plurality of switching devices 151 performing the relay processing not involving the communication protocol conversion. The gateway 101 or the switching device 151 manages the data update of the target device mounted on the vehicle 1. The gateway 101 receives the update data for the target device from the external device 181 disposed outside the vehicle 1. The gateway 101 transmits, to the switching device 151 connected thereunder, the update data for the target device connected to the switching device 151, without holding the update data at least after completing the update, and holds the update data for the target device connected thereto not through the switching device 151 also after completing the update.

Owing to the configuration in which the gateway 101 thus transmits, to the switching device 151 connected thereunder, the update data for the target device connected to the switching device 151, the switching device 151 can be caused to manage the data update of the target device by, for example, causing the switching device 151 to hold the update data. Besides, owing to the configuration in which the gateway 101 does not hold the update data for the target device at least after completing the update, the consumption of the storage area in the gateway 101 can be suppressed. Furthermore, owing to the configuration in which the gateway 101 holds the update data for the target device connected thereto not through the switching device 151 also after completing the update, the data update of the target device can be easily managed. Accordingly, while managing the data update of the target device in the in-vehicle communication system, the gateway can be preventing from running out of free space in the storage area.

In addition, the in-vehicle communication system according to the embodiment of the present disclosure includes a plurality of serially connected switching devices 151. Each switching device 151 receives the update data from the gateway 101 or a different switching device 151 disposed on the upstream side. The switching device 151 transmits, to a different switching device 151 disposed on the downstream side, the update data for the target device connected to the different switching device 151, without holding the update data at least after completing the update, and holds the update data for the target device connected thereto not through a different switching device 151 also after completing the update.

Owing to the configuration in which the switching device 151 thus holds, also after completing the update, the update data transmitted from the gateway 101 or a different switching device 151 disposed on the upstream side and corresponding to the update data for the target device connected thereto not through a different switching device 151, the update data is held in the own switching device 151, and hence the gateway 101 can delete the update data. Besides, owing to the configuration in which the switching device 151 transmits the update data for the target device connected to a different switching device 151 disposed on the downstream side to this different switching device 151, this different switching device 151 can be caused to manage the data update of the target device by, for example, causing the different switching device 151 to hold the update data. Furthermore, owing to the configuration in which the switching device 151 does not hold the update data for the target device at least after completing the update, the consumption of the storage area in the switching device 151 can be suppressed.

Besides, in the in-vehicle communication system according to the embodiment of the present disclosure, the switching device 151 manages the data update of the target device connected thereto not through a different switching device 151. The gateway 101 instructs the switching device 151 thus managing the data update to perform the data update of the target device.

Owing to such a configuration, the processing for managing the target devices can be decentralized to the switching devices 151 in the in-vehicle communication system 301, and hence, the processing load of the gateway 101 can be reduced.

Besides, in the in-vehicle communication system according to the embodiment of the present disclosure, when the data update is completed, the switching device 151 performs the processing Pa for discarding the update data held before the update and holding the update data of after the update.

Owing to the configuration in which the update data held before the update is not thus discarded until the update of the target device is completed, for example, when the update of the target device has failed, the target device can be restarted by using the update data held before the update. Besides, owing to the configuration in which the update data of after the update is held, failure of the update of the target device can be coped with in performing new update.

Furthermore, in the in-vehicle communication system according to the embodiment of the present disclosure, the gateway 101 manages the data update of the target device connected to the switching device 151 connected thereunder.

Owing to such a configuration, the processing for managing the target devices can be concentrated on the gateway 101 in the in-vehicle communication system 301, and therefore, maintenance of the in-vehicle communication system 301 can be simplified.

Besides, in the in-vehicle communication system according to the embodiment of the present disclosure, the switching device 151 monitors data transmitted or received therethrough between the gateway 101 and the target device. The switching device 151 holds the update data transmitted therethrough from the gateway 101 to the target device.

Owing to such a configuration, the processing for downloading the update data by the switching device 151 and the processing for downloading the update date by the target device can be performed in parallel, and therefore, time necessary for the downloading processing can be shortened as compared with time necessary in a configuration in which the update data is successively downloaded by the switching device 151 and the target device.

Furthermore, in the in-vehicle communication system according to the embodiment of the present disclosure, when the update complete notification transmitted from the target device to the gateway 101 is detected, the switching device 151 performs the processing Pa for discarding the update data held before the update and holding the update data of after the update.

Owing to such a configuration in which the update data held before the update is not discarded until the detection of the update complete notification transmitted when the update of the target device is completed, for example, when the update of the target device has failed, the target device can be restarted by using the update data held before the update. Besides, owing to the configuration in which the update data of after the update is held, the failure of the update of the target device can be coped with in performing new update.

Furthermore, in the in-vehicle communication system according to the embodiment of the present disclosure, when the prescribed condition C1 is satisfied after the data update is completed, the switching device 151 performs the processing Pa.

Owing to such a configuration, for example, when the communication rate of the switching device 151 is high at timing immediately after completing the data update, the processing Pa may be delayed until the communication rate becomes low, and hence, excessive load can be prevented from being applied to the switching device 151.

Besides, the gateway according to the embodiment of the present disclosure is mounted on the vehicle 1. The relay section 21 is capable of performing the relay processing involving the communication protocol conversion. The management section 23 manages the data update of the target device mounted on the vehicle 1. The relay section 21 receives the update data for the target device from the external device 181 disposed outside the vehicle 1. The volatile memory 24 holds the update data received by the relay section 21. The relay section 21 transmits data to be relayed, which is the update data for the target device connected to the switching device 151 connected thereunder and performing the relay processing not involving the communication protocol conversion, to the switching device 151. The management section 23 deletes the data to be relayed from the volatile memory 24 at least after completing the update, and causes the non-volatile memory 25 to hold, also after completing the update, the update data for the target device connected to the own gateway 101 not through the switching device 151.

Owing to the configuration in which the gateway 101 thus transmits the data to be relayed to the switching device 151, the switching device 151 can be caused to manage the data update of the target device by, for example, causing the switching device 151 to hold the data to be relayed. Besides, owing to the configuration in which the data to be relayed is deleted from the volatile memory 24 at least after completing the update, the consumption of the storage area in the gateway 101 can be suppressed. Furthermore, owing to the configuration in which the gateway 101 holds, also after completing the update, the update data for the target device connected thereto not through the switching device 151, the data update of the target device can be easily managed. Accordingly, while managing the data update of the target device in the in-vehicle communication system, the gateway can be prevented from running out of free space in the storage area.

Besides, the switching device according to the embodiment of the present disclosure is mounted on the vehicle 1. The switching device 51 performs the relay processing not involving the communication protocol conversion. The management section 53 manages the data update of the target device mounted on the vehicle 1. To the switching device 151, the gateway 101 capable of performing the relay processing involving the communication protocol conversion is connected. The switching section 51 receives the update data for the target device from the gateway 101 or a different switching device 151 disposed on the upstream side toward the gateway 101. The buffer 52, the volatile memory 54 and the non-volatile memory 55 hold the update data received by the switching section 51. The switching section 51 transmits, to a different switching device 151 disposed on the downstream side, the data to be relayed, which corresponds to the update data for the target device connected to the different switching device 151 disposed on the downstream side, and deletes the data to be relayed from the buffer 52 at least after completing the update. The management section 53 causes the non-volatile memory 55 to hold, also after completing the update, the update data for the target device connected to the own switching device 151 not through a different switching device 151.

Owing to such a configuration in which the switching device 151 thus holds, also after completing the update, the update data that is received from the gateway or the different switching device 151 disposed on the upstream side and corresponds to the update data for the target device connected thereto not through a different switching device 151, the switching device can easily manage the data update of the target device, and since the update data is held in the switching device, the gateway can delete the update data. Furthermore, owing to the configuration in which the switching device transmits the data to be relayed to the different switching device 151 disposed on the downstream side, the different switching device 151 can be caused to manage the data update of the target device by, for example, causing the different switching device 151 disposed on the downstream side to hold the data to be relayed. Besides, owing to the configuration in which the data to be relayed is deleted from the buffer 52 at least after completing the update, the consumption of the storage area in the switching device 151 can be suppressed. Accordingly, while managing the data update of the target device in the in-vehicle communication system, the gateway can be prevented from running out of free space in the storage area.

The above-described embodiments are intended to be illustrative and not restrictive in all respects. The spirit of the present disclosure is defined not by the aforementioned description but by the scope of the appended claims, and embraces all modifications and changes within the meaning and range of equivalency of the claims.

It is to be noted that, as used herein and in the appended claims, the singular forms "a", "an", and "the" include plural referents unless the context clearly dictates otherwise.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

The description given so far includes features listed in the following notes:

[Note 1]

An in-vehicle communication system to be mounted on a vehicle, including: a gateway capable of performing relay processing involving communication protocol conversion; and one or a plurality of switching devices performing relay processing not involving the communication protocol conversion, in which the gateway or the switching device manages data update of a target device mounted on the vehicle; the gateway receives, from an external device disposed outside the vehicle, update data for the target device, transmits the update data for the target device, which is connected to the switching device, to the switching device connected thereunder, not holding the update data at least after completing the update, and holds the update data for the target device, which is connected thereto, also after completing the update not through the switching device; the gateway is able to perform the relay processing through communication protocol according to communication standards of CAN (Controller Area Network) and through communication protocol according to communication standards of Ethernet; the switching device performs the relay processing through the communication protocol according to the communication standards of Ethernet; and the external device is a FOTA (Firmware On-The-Air) server, and transmits, to the gateway as the update data, latest firmware for the target device, or differential data between firmware currently used by the target device and the latest firmware.

[Note 2]

A gateway to be mounted on a vehicle, including: a relay section capable of performing relay processing involving communication protocol conversion; a management section managing data update of a target device mounted on the vehicle; and a storage section, in which the relay section receives update data for the target device from an external device disposed outside the vehicle; the storage section holds the update data received by the relay section; the relay section transmits, to a switching device performing relay processing not involving communication protocol conversion, data to be relayed corresponding to the update data for the target device, which is connected to the switching device; the management section deletes the data to be relayed from the storage section at least after completing the update, and causes the storage section to hold, also after completing the update, the update data for the target device, which is connected to the own gateway not through the switching device; the relay section is able to perform the relay processing through communication protocol according to communication standards of CAN and through communication protocol according to communication standards of Ethernet; the switching device performs the relay processing through the communication protocol according to the communication standards of Ethernet; and the external device is a FOTA server, and transmits, to the gateway as the update data, latest firmware for the target device, or differential data between firmware currently used by the target device and the latest firmware.

[Note 3]

A switching device to be mounted on a vehicle, including a switching section performing relay processing not involving communication protocol conversion; a management section managing data update of a target device mounted on the vehicle; and a storage section, in which a gateway capable of performing relay processing involving the communication protocol conversion is connected to the switching device; the switching device receives update data for the target device from the gateway or a different switching device disposed on an upstream side toward the gateway; the storage section holds the update data received by the switching section; the switching section transmits, to a different switching device disposed on a downstream side, data to be relayed corresponding to the update data for the target device, which is connected to the different switching device disposed on the downstream side, and deletes the data to be relayed from the storage section at least after completing the update; the management section causes the storage section to hold, also after completing the update, the update data for the target device, which is connected to the own switching device not through the different switching device; the gateway is able to perform the relay processing through communication protocol according to communication standards of CAN and through communication protocol according to communication standards of Ethernet; and the switching device performs the relay processing through the communication protocol according to the communication standards of Ethernet.

What is claimed is:

1. An in-vehicle communication system to be mounted on a vehicle, comprising:
a gateway performing relay processing involving communication protocol conversion; and
one or a plurality of switching devices performing relay processing not involving the communication protocol conversion,
wherein the gateway is connected, not through the switching device, to a first target device mounted on the vehicle,
the gateway is connected, through the switching device, to a second target device mounted on the vehicle,
the gateway manages data update of the first target device,
the switching device manages data update of the second device,
the gateway receives first update data for the first target device and second update data for the second target device, from an external device disposed outside the vehicle,
the gateway transmits, to the switching device, the second update data, and does not hold the second update data at least after the update of the second target device is completed, and
the gateway holds the first update data, even after the update of the first target device is completed.

2. The in-vehicle communication system according to claim 1, comprising a plurality of the switching devices serially connected to each other, the plurality of the switching devices comprising:
a first switching device; and
a second switching device,
wherein the first switching device is connected, not through a different one of the switching devices, to the second target device,
the second switching device disposed on a downstream side of the gateway,
the second switching device disposed on an upstream side of the first switching device,
the second switching device is connected, not through a different one of the switching devices, to a third target device mounted on the vehicle,
the second switching device receives the second update data and third update data for the third target device, from the upstream side,
the second switching device transmits the second update data to the different one of the switching devices disposed on the downstream side, and does not hold the second update data at least after the update of the second target device is completed, and
the second switching device holds the third update data, even after the update of the third target device is completed.

3. The in-vehicle communication system according to claim 1,
wherein each of the switching devices manages the data update of the second target device, which is connected thereto not through a different one of the switching devices, and
the gateway instructs the switching device managing the data update to perform the data update of the second target device.

4. The in-vehicle communication system according to claim 3, wherein each of the switching devices performs, when the data update of the second target device is completed, processing for discarding the second update data held before the update and holding the second update data of after the update.

5. The in-vehicle communication system according to claim 1, wherein the gateway manages the data update of the second target device.

6. The in-vehicle communication system according to claim 5, wherein each of the switching devices monitors data transmitted or received therethrough between the gateway and the second target device, and holds the second update data transmitted therethrough from the gateway to the second target device.

7. The in-vehicle communication system according to claim 6, wherein each of the switching devices performs processing for discarding the second update data held before the update and holding the second update data of after the update when an update complete notification transmitted from the second target device to the gateway is detected.

8. The in-vehicle communication system according to claim 4, wherein each of the switching devices performs the processing when a prescribed condition is satisfied after the data update of the second target device is completed.

9. A gateway to be mounted on a vehicle, comprising:
a processing unit configured to read a program from a memory to execute operations; and
a storage unit;
the operations comprising:
performing relay processing involving communication protocol conversion; and
managing data update of a target device mounted on the vehicle,
wherein a first target device mounted on the vehicle is connected to the gateway, not through a switching device connected under the gateway and performing relay processing not involving the communication protocol conversion, and
a second target device mounted on the vehicle is connected to the gateway through the switching device,
the relay processing involving communication protocol conversion, comprising:
receiving first update data for the first target device and second update data for the second target device, from an external device disposed outside the vehicle; and
transmitting the second update data to the switching device,
the managing comprising:
causing the storage unit to hold the first update data and the second update data received through the relay processing involving communication protocol conversion;
deleting the second update data from the storage unit at least after completing the update; and
causing the storage unit to hold, also after completing the update, the first update data.

10. A switching device to be mounted on a vehicle, comprising:
a processing unit configured to read a program from a memory to execute operations; and
a storage unit;
the operations comprising:
performing relay processing not involving communication protocol conversion; and
managing data update of a target device mounted on the vehicle,
wherein a gateway performing relay processing involving the communication protocol conversion is to be connected to the switching device,
a first target device mounted on the vehicle is connected to the switching device, not through another switching device, and
a second target device mounted on the vehicle is connected to the switching device through a different switching device disposed on a downstream side,
the relay processing not involving communication protocol conversion, comprising:
receiving first update data for the first target device and second update data for the second target device, from the gateway or a different switching device disposed on an upstream side toward the gateway; and
transmitting the second update data to the different switching device disposed on the downstream side,
the managing comprising:
causing the storage unit to hold the first update data and the second update data received through the relay processing not involving communication protocol conversion;
deleting the second update data from the storage unit at least after completing the update; and
causing the storage unit to hold, also after completing the update, the first update data.

11. A communication control method to be employed in a gateway mounted on a vehicle, capable of performing relay processing involving communication protocol conversion, and including a storage section, comprising:
managing data update of first and second target devices mounted on the vehicle;
receiving first update data for the first target device and second update data for the second target device, from an external device disposed outside the vehicle;
holding the received first and second update data in the storage section; and
transmitting data to be relayed corresponding to the second update data for the second target device, which is connected to a switching device connected thereunder and performing relay processing not involving the communication protocol conversion, to the switching device,
wherein in the managing data update, the data to be relayed is deleted from the storage section at least after completing the update, and the storage section is caused to hold, also after completing the update, the first update data for the first target device, which is connected to the gateway not through the switching device.

12. A communication control method to be employed in a switching device mounted on a vehicle, performing relay processing not involving communication protocol conversion and including a storage section, the switching device being connected to a gateway performing relay processing involving the communication protocol conversion, the communication control method comprising:
managing data update of first and second target devices mounted on the vehicle;
receiving first update data for the first target device and second update data for the second target device, from the gateway or a different switching device disposed on an upstream side toward the gateway;
holding the received first and second update data in the storage section; and
transmitting data to be relayed corresponding to the second update data for the second target device, which is connected to a different switching device disposed on a downstream side, to the different switching device disposed on the downstream side, and deleting the data to be relayed from the storage section at least after completing the update,
wherein in the managing data update, the storage section is caused to hold the first update data for the first target device, which is connected to the one switching device not through the different switching device also after completing the update.

13. The in-vehicle communication system according to claim 7, wherein each of the switching devices performs the processing when a prescribed condition is satisfied after the data update of the second target device is completed.

* * * * *